United States Patent
Utsunomiya et al.

(10) Patent No.: US 9,342,792 B2
(45) Date of Patent: May 17, 2016

(54) QUANTUM COMPUTER AND QUANTUM COMPUTING USING ISING MODEL

(71) Applicants: Inter-University Research Institute Corporation, Research Organization of Information and Systems, Tokyo (JP); The Board of Trustees of the Leland Stanford Junior University, Palo Alto, CA (US)

(72) Inventors: Shoko Utsunomiya, Tokyo (JP); Kenta Takata, Tokyo (JP); Yoshihisa Yamamoto, Stanford, CA (US); Kai Wen, Mountain View, CA (US)

(73) Assignees: Inter-University Research Institute Corporation, Research Organization of Information and Systems, Tokyo (JP); The Board of Trustees of the Leland Stanford Junior University, Palo Alto, CA (US)

( * ) Notice: Subject to any disclaimer, the term of this patent is extended or adjusted under 35 U.S.C. 154(b) by 379 days.

(21) Appl. No.: 14/074,295

(22) Filed: Nov. 7, 2013

(65) Prior Publication Data
US 2014/0200689 A1 Jul. 17, 2014

(30) Foreign Application Priority Data
Jan. 11, 2013 (JP) ................................ 2013-003293

(51) Int. Cl.
*G06N 99/00* (2010.01)
*B82Y 10/00* (2011.01)

(52) U.S. Cl.
CPC .............. *G06N 99/002* (2013.01); *B82Y 10/00* (2013.01)

(58) Field of Classification Search
CPC ........... G01R 33/1284; G01R 33/0023; B82Y 10/00; G06N 99/002
See application file for complete search history.

(56) References Cited

U.S. PATENT DOCUMENTS

| | | | | |
|---|---|---|---|---|
| 4,600,889 | A * | 7/1986 | Rugen | H03L 7/14 331/12 |
| 5,390,021 | A * | 2/1995 | Nagata | G01C 19/727 356/461 |
| 5,671,241 | A * | 9/1997 | Stamm | G02F 1/39 359/330 |
| 5,929,430 | A * | 7/1999 | Yao | H01S 5/065 250/205 |
| 6,175,283 | B1 * | 1/2001 | Fehrenbach | G01S 7/282 331/117 D |
| 6,282,014 | B1 * | 8/2001 | Long | G02F 1/39 359/326 |
| 6,411,411 | B1 * | 6/2002 | Okazaki | H04J 14/0221 359/578 |

(Continued)

OTHER PUBLICATIONS

Byrnes, et al., "Optimization Using Bose-Einstein Condensation and Measurement—Feedback Circuits", Feb. 19, 2013, 10 pp.

*Primary Examiner* — Ramesh Patel
(74) *Attorney, Agent, or Firm* — Ohlandt, Greeley, Ruggiero & Perle, L.L.P.

(57) ABSTRACT

For each pair of a plurality of slave lasers B for which injection synchronization is performed by a master laser M, by controlling the intensity of light exchanged between two slave lasers B and an optical path length between the two slave lasers B using a slave-to-laser intensity control unit IA and an inter-slave laser optical path length control unit IP, the magnitude and the sign of pseudo ising interaction $J_{ij}$ between the two slave lasers B are implemented. After the plurality of slave lasers B arrive at a steady state, by measuring relative values of the oscillation phases of the plurality of slave lasers B with respect to the oscillation phase of the master laser M by using an oscillation phase measuring unit PM, pseudo ising spins $\sigma_i$ of the plurality of slave lasers B are measured.

20 Claims, 37 Drawing Sheets

(56) References Cited

U.S. PATENT DOCUMENTS

| | | | |
|---|---|---|---|
| 6,762,869 B2 * | 7/2004 | Maleki | G04F 5/00 250/227.11 |
| 6,894,572 B2 * | 5/2005 | Heide | G01S 13/84 331/10 |
| 2014/0046626 A1 * | 2/2014 | Yamamoto | G06N 99/002 702/151 |

* cited by examiner

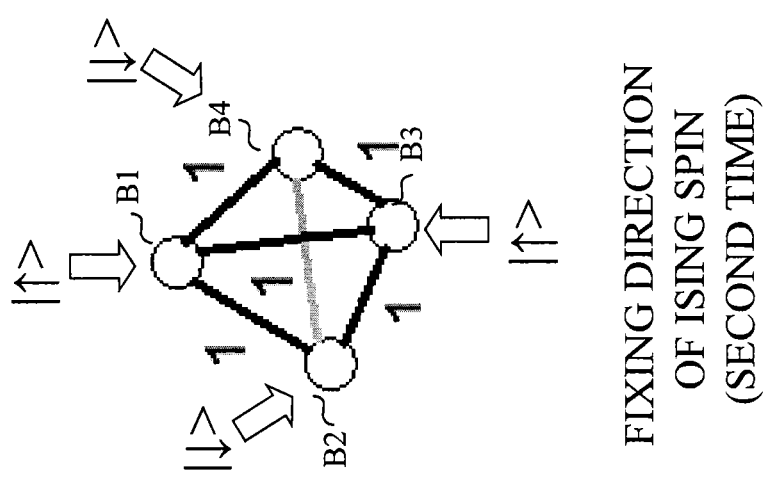

QUANTUM COMPUTER AND QUANTUM COMPUTING USING ISING MODEL

BACKGROUND

1. Field of the Disclosure

The present disclosure provides a computer and computing capable of easily solving an NP-complete problem mapped into the ising model by easily solving the ising model.

2. Discussion of the Background Art

The ising model has been researched originally as a model of a magnetic material but recently attracts attention as a model mapped in an NP-complete problem or the like. However, it is very difficult to solve the ising model when the number of sites is large. Thus, a quantum annealing machine and a quantum adiabatic machine in which the ising model is implemented are proposed.

In the quantum annealing machine, after ising interaction and Zeeman energy are physically implemented, the system is sufficiently cooled so as to realize a ground state, and the ground state is observed, whereby the ising model is solved. However, in a case where the number of sites is large, the system is trapped into a metastable state in the process of being cooled, and the number of the metastable states exponentially increases with respect to the number of sites, whereby there is a problem in that the metastable state is not easily mitigated to the ground state.

In the quantum adiabatic machine, transverse magnetic field Zeeman energy is physically implemented, and then the ground state of the transverse magnetic field Zeeman energy is realized by sufficiently cooling the system. Then, the transverse magnetic field Zeeman energy is gradually lowered, ising interaction is physically implemented gradually, the ground state of the system that includes the ising interaction and vertical magnetic field Zeeman energy is realized, and ground state is observed, whereby the ising model is solved. However, when the number of sites is large, there is a problem in that the speed of gradually lowering transverse magnetic field Zeeman energy and physically implementing the ising interaction in a gradual manner needs to be exponentially decreased with respect to the number of sites.

In a case where the NP-complete problem or the like is mapped into an ising model, and the ising model is implemented as a physical spin system, there is a problem of a natural law that ising interaction between sites that are physically located close to each other is large, and ising interaction between sites that are physically located far from each other is small. The reason for this is that, in an artificial ising model in which the NP-complete problem is mapped, there may be cases where ising interaction between sites that are physically located close to each other is small, and ising interaction between sites that are physically located far is large. The difficulty in mapping into a natural spin system also makes it difficult to easily solve the NP-complete problem or the like.

CITATION LIST

Non-Patent Literature

Non-Patent Literature 1: Tim Byrnes, Kai Yan, and Yoshihisa Yamamoto, Optimization using Bose-Einstein condensation and measurement-feedback circuits, [online], Jan. 26, 2010, arXiv.org, [searched on Oct. 9, 2012], the Internet URL:http://arxiv.org/abs/0909.2530

The configuration of an ising model computer that is disclosed in Non-Patent Literature 1 for solving some of the above-described problems is illustrated in FIG. 1. The ising model computer is configured by Bose-Einstein condensing units B1, B2, and B3, spin measuring units D1, D2, and D3, a feedback control circuit F, and ising interaction implementing units I1, I2, and I3.

The Bose-Einstein condensing units B1, B2, and B3 are systems in which almost all the Bose particles are in the ground state at a very low temperature and are configured by exciton polaritons included in semiconductor micro-cavities, neutral atoms each having an unpaired electron, or the like. The Bose-Einstein condensing units B1, B2, and B3 are respectively applied with magnetic fields $B_1$, $B_2$, and $B_3$ to be described later and are configured by Bose particles having mutually-different spin directions denoted by white circles and black circles illustrated in FIG. 1.

The spin measuring units D1, D2, and D3 output currents $I_1$, $I_2$, and $I_3$ that are in proportion to sums of all the spins respectively included in the Bose-Einstein condensing units B1, B2, and B3. Here, a sum Si of all the spins inside each site is represented as below. Here, $\sigma_i$ represents the spin of each Bose particle of each site, and N represents a total number of Bose particles of each site.

$$S_i = \sum_{k=1}^{N} \sigma_i^k \qquad \text{[Numerical Expression 1]}$$

The feedback control circuit F receives the currents $I_1$, $I_2$, and $I_3$ as inputs respectively from the spin measuring units D1, D2, and D3 and outputs feedback signals to the ising interaction implementing units I1, I2, and I3. The ising interaction implementing units I1, I2, and I3 input the feedback signals from the feedback control circuit F and applies magnetic fields $B_1$, $B_2$, and $B_3$ to the Bose-Einstein condensing units B1, B2, and B3 respectively. Here, the magnetic fields $B_1$, $B_2$, and $B_3$ are represented as below. In addition, $J_{ij}$ represents an ising interaction coefficient between an i-th site and a j-th site, and M represents the number (three in FIG. 1) of all the sites.

$$B_i = \sum_{j=1}^{M} J_{ij} S_j \qquad \text{[Numerical Expression 2]}$$

Hamiltonian H of all the Bose-Einstein condensing units B1, B2, and B3 is represented as below. In other words, the ising interaction is implemented.

$$H = \sum_{i=1}^{M} B_i S_i = \sum_{i,j=1}^{M} J_{ij} S_i S_j \qquad \text{[Numerical Expression 3]}$$

When the ising model computer illustrated in FIG. 1 is applied as a quantum annealing machine, the problem that the system is not easily mitigated from the metastable state to the ground state can be partly solved. In other words, in a case where the mitigation rate from the metastable state to the ground state is A when the number of Bose particles occupying the ground state is zero, the mitigation rate amplifies to A(L+1) when the number L of Bose particles occupying the ground state. Here, since L and N are of a same order, the computation time is shortened in inverse proportion to the number N of Bose particles.

When the ising model computer illustrated in FIG. 1 is applied as a quantum adiabatic machine, the problem that the speed of physically implementing the ising interaction in a gradual manner needs to be lowered in accordance with an increase in the number of sites can be partly solved. In other words, even in a case where a change in Hamiltonian is too fast, and Bose particles leak from the ground state to an excited state, the Bose particles are returned from the excited state to the ground state by Bose-Einstein condensing, and error correction is made in proportion to the number N of Bose particles. Accordingly, the computation time is shortened in inverse proportion to the number N of Bose particles.

In the ising model computer illustrated in FIG. 1 can freely control not only the magnitude of ising interaction between sites that are physically located close to each other but also the magnitude of ising interaction between sites that are physically located far from each other through the feedback control circuit F. Accordingly, regardless of a physical distance between sites, an artificial ising model mapped from an NP-complete problem or the like can be solved.

In the ising model computer illustrated in FIG. 1, for N spins included in each site, it is determined whether one type of upward and downward spins is more than the other type based on the rule of majority. Thus, the temperature of the system is a finite temperature, and, accordingly, even when there is a spin leaking from the ground state to the excited state, the probability of acquiring a correct solution is markedly higher when the number of spins included in each site is N than that when the number of spins is one.

However, in the ising model computer illustrated in FIG. 1, the spin measuring units D1, D2, and D3 output currents $I_1$, $I_2$, and $I_3$ that are respectively in proportion to sums of all the spins included in the Bose-Einstein condensing units B1, B2, and B3, and the feedback control circuit F receives the currents $I_1$, $I_2$, and $I_3$ from the spin measuring units D1, D2, and D3 as inputs and outputs feedback signals to the ising interaction implementing units I1, I2, and I3. In other words, for each feedback, quantum coherence of the whole system is broken, whereby the spin state of the whole system is determined.

Here, the determined spin state of the whole system is not always the ground state. Thus, the spin state of the whole system needs to be determined over and over until the spin state of the whole system is settled to the ground state, and, in a worst case, spin states of $2^M$ kinds of the whole system need to be determined. In other words, the computation time is in proportion to $2^M/N$, and thus, even when Bose-Einstein condensing is applied, the exponential divergence of the computation time cannot be suppressed.

Thus, in order to solve the above-described problems, an object of the present disclosure is to provide a computer and computing for suppressing exponential divergence of the computation time of an NP-complete problem or the like mapped into an ising model.

SUMMARY

In order to achieve the above-described object, for each pair of a plurality of coherent oscillators for which injection synchronization is performed by a master oscillator, by controlling the intensity of light exchanged between two coherent oscillators and an optical path length between the two coherent oscillators, the magnitude and the sign of the pseudo ising interaction between the two coherent oscillators are implemented. Then, after the plurality of coherent oscillators arrive at the steady state, by measuring relative values of the oscillation phases of the plurality of coherent oscillators with respect to the oscillation phase of the master oscillator, pseudo ising spins of the plurality of coherent oscillators are measured.

Specifically, according to the present disclosure, a quantum computer using an ising model includes: a plurality of coherent oscillators that oscillate light having polarization polarized in a same direction determined in advance in correspondence with a plurality of sites of the ising model; a master oscillator that performs injection synchronization for the plurality of coherent oscillators and oscillates the light having polarization polarized in the same direction determined in advance; a master oscillator-to-coherent oscillator optical path unit that is arranged between the master oscillator and each one of the coherent oscillators; an inter-coherent oscillator optical path unit that is arranged between two coherent oscillators for each pair of the plurality of the coherent oscillators; an oscillation frequency control unit that is arranged in each master oscillator-to-coherent oscillator optical path unit and controls an oscillation frequency of each one of the coherent oscillators so as to be an oscillation frequency of the master oscillator; an inter-coherent oscillator intensity control unit that is arranged in each inter-coherent oscillator optical path unit for each pair of the plurality of the coherent oscillators and implements a magnitude of pseudo ising interaction between two coherent oscillators by controlling an intensity of light exchanged between the two coherent oscillators; an inter-coherent oscillator optical path length control unit that is arranged in each inter-coherent oscillator optical path unit for each pair of the plurality of the coherent oscillators and implements a sign of the pseudo ising interaction between two coherent oscillators by controlling an optical path length between the two coherent oscillators; and an oscillation phase measuring unit that measures pseudo ising spins of the plurality of the coherent oscillators by measuring relative values of oscillation phases of the plurality of the coherent oscillators with respect to the oscillation phase of the master oscillator after the plurality of the coherent oscillators arrive at a steady state.

According to the present disclosure, a quantum computing using an ising model includes: starting oscillation of a plurality of coherent oscillators that oscillate light having polarization polarized in a same direction determined in advance in correspondence with a plurality of sites of the ising model and an oscillation stat step of starting oscillation of a master oscillator that performs injection synchronization for the plurality of coherent oscillators and oscillates light having polarization polarized in the same direction determined in advance; an oscillation frequency control step of controlling an oscillation frequency of each one of the coherent oscillators so as to be an oscillation frequency of the master oscillator; implementing the magnitude of pseudo ising interaction between two coherent oscillators by controlling the intensity of light exchanged between the two coherent oscillators for each pair of the plurality of the coherent oscillators and an inter-coherent oscillator intensity optical path length control step of implementing the sign of the pseudo ising interaction between two coherent oscillators by controlling an optical path length between the two coherent oscillators for each pair of the plurality of the coherent oscillators; and an oscillation phase measurement step of measuring pseudo ising spins of the plurality of the coherent oscillators by measuring relative values of oscillation phases of the plurality of the coherent oscillators with respect to the oscillation phase of the master oscillator after the plurality of the coherent oscillators arrive at a steady state.

According to such a configuration, the oscillation phase of light emitted from the coherent oscillator is associated with the pseudo spin direction of the coherent oscillator, and the pseudo spin state of the whole system is measured. Until the pseudo spin state of the whole system is settled to the ground state, the quantum coherence of the whole system is not broken, and accordingly, the problem of exponentially increasing of the computation time in accordance with the number of all the sites is solved, whereby the computation time can be shortened to a large extent.

Thus, for any pair out of M sites, through light exchanged between two sites, not only ising interaction between sites physically located close to each other but also ising interaction between sites located far from each other can be implemented. Accordingly, regardless of a physical distance between sites, an ising model in which any NP-complete problem or the like can be mapped can be solved.

In addition, for a number of pseudo spins in each site, whether one of the upward circulation and the downward circulation is more than the other is determined based on the rule of majority. Accordingly, even when there is a pseudo spin that is leaked from the ground state to the excited state, the probability of acquiring a correct solution is markedly higher in a case where there are a number of pseudo spins than that in a case where there is one pseudo spin.

Here, as the whole system transits from the initial state to the steady state, the oscillation phase of each coherent oscillator deviates from that of the master laser, but the oscillated polarized light of each coherent oscillator is constantly the same as that of the master laser.

Thus, for each coherent oscillator, a differential equation of the temporal developments of only three including the oscillation intensity, the oscillation phase, and the inverted population number difference of carriers may be formulated. Each coherent oscillator might have the direction of single oscillated polarized light, and accordingly, even in the case of a semiconductor surface emission laser having in-plane anisotropy, the in-plane anisotropy does not matter. As above, the quantum computer using the ising model can be easily designed and manufactured.

In the quantum computer using an ising model according to the present disclosure, each inter-coherent oscillator optical path length control unit implements the sign of pseudo ising interaction between two coherent oscillators by performing control such that an optical path length between the two coherent oscillators is a half-integer multiple or an integer multiple of an oscillation wavelength of the injection synchronization.

In the quantum computing using an ising model according to the present disclosure, the inter-coherent oscillator intensity optical path length control step implements the sign of pseudo ising interaction between two coherent oscillators by performing control such that the optical path length between the two coherent oscillators is a half-integer multiple or an integer multiple of an oscillation wavelength of the injection synchronization.

According to such a configuration, for each pair of coherent oscillators, when the ising interaction is positive, a deviation between oscillation phases of two coherent oscillators is π (the deviation may be zero depending on the definition of the sign of the ising interaction), and the oscillation mode can be easily started. On the other hand, when the ising interaction is negative, a deviation between the oscillation phases of two coherent oscillators is zero (the deviation may be π depending on the definition of the sign of the ising interaction), and the oscillation mode can be easily started.

Above all, in the whole ising model computer, one oscillation mode is configured to be integrally started. Thus, in each pair of coherent oscillators, when there is a case where the above-described oscillation mode is actually started, there is also a case where the oscillation mode is not necessarily started.

In the quantum computer using an ising model according to the present disclosure, the oscillation phase measuring unit determines that directions of pseudo ising spins of two coherent oscillators to be the same when oscillation phases of both the coherent oscillators lead before or lag behind the oscillation phase of the master oscillator for each pair of the plurality of the coherent oscillators and determines that the directions of the pseudo ising spins of two coherent oscillators to be different from each other when an oscillation phase of one coherent oscillator leads before the oscillation phase of the master oscillator and the oscillation phase of the other coherent oscillator lags behind the oscillation phase of the master oscillator for each pair of the plurality of the coherent oscillators.

In the quantum computing using an ising model according to the present disclosure, in the oscillation phase measurement step, directions of pseudo ising spins of two coherent oscillators are determined to be the same when oscillation phases of both the coherent oscillators lead before or lag behind the oscillation phase of the master oscillator for each pair of the plurality of the coherent oscillators, and the directions of the pseudo ising spins of two coherent oscillators are determined to be different from each other when an oscillation phase of one coherent oscillator leads before the oscillation phase of the master oscillator, and the oscillation phase of the other coherent oscillator lags behind the oscillation phase of the master oscillator.

According to such a configuration, the sign of a relative value of the oscillation phase of the coherent oscillator with respect to the oscillation phase of the master oscillator can be configured to be in correspondence with the direction of the pseudo spin.

The quantum computer using an ising model according to the present disclosure further includes: a master oscillator-to-coherent oscillator intensity control unit that is arranged in each master oscillator-to-coherent oscillator optical path unit and implements the magnitude of pseudo Zeeman energy in each coherent oscillator by controlling the intensity of light injected into each coherent oscillator; and a master oscillator-to-coherent oscillator phase control unit that is arranged in each master oscillator-to-coherent oscillator optical path unit and implements the sign of the pseudo Zeeman energy in each coherent oscillator by controlling the phase of light injected into each coherent oscillator.

The quantum computing using an ising model according to the present disclosure further includes implementing the magnitude of pseudo Zeeman energy in each coherent oscillator by controlling the intensity of light injected into each coherent oscillator and a master oscillator-to-coherent oscillator intensity phase control step of implementing the sign of the pseudo Zeeman energy in each coherent oscillator by controlling the phase of light injected into each coherent oscillator, in parallel with the inter-coherent oscillator intensity optical path control step.

According to such a configuration, Zeeman energy can be applied to a system in which only ising interaction is present, whereby the energy degeneracy in ground state can be resolved.

In the quantum computer using an ising model according to the present disclosure, each master oscillator-to-coherent oscillator phase control unit implements the sign of the pseudo Zeeman energy in each coherent oscillator by controlling lead or lag of an injection phase for each coherent oscillator with respect to the oscillation phase of the master oscillator.

In the quantum computing using an ising model according the present disclosure, in the master oscillator-to-coherent oscillator intensity phase control step, the sign of the pseudo Zeeman energy in each coherent oscillator is implemented by controlling lead or lag of an injection phase for each coherent oscillator with respect to the oscillation phase of the master oscillator.

According to such a configuration, for each coherent oscillator, when the Zeeman energy is positive, the oscillation phase of the coherent oscillator lags behind the oscillation phase of the master oscillator (the oscillation phase may lead depending on the definition of the sign of the Zeeman energy), and accordingly, the oscillation mode can be easily started. On the other hand, when the Zeeman energy is negative, the oscillation phase of the coherent oscillator leads before the oscillation phase of the master oscillator (the oscillation phase may lag depending on the definition of the sign of the Zeeman energy), and accordingly, the oscillation mode can be easily started.

Above all, in the whole ising model computer, one oscillation mode is configured to be integrally started. Thus, in the coherent oscillator, when there is a case where the above-described oscillation mode is actually started, there is also a case where the oscillation mode is not necessarily started.

In the quantum computer using an ising model according to the present disclosure, each oscillation frequency control unit controls the oscillation frequency of each coherent oscillator so as to be the oscillation frequency of the master oscillator by performing control such that an interference intensity of oscillated light of each coherent oscillator and oscillated light of the master oscillator is an extreme value with respect to a change in the oscillation frequency of each coherent oscillator.

According to such a configuration, since the oscillation frequency of each coherent oscillator is controlled so as to be the oscillation frequency of the master oscillator, as the whole quantum computer using the ising model, one oscillation mode integrally can be started.

In the quantum computer using an ising model according to the present disclosure, each inter-coherent oscillator optical path length control unit controls an optical path length between two coherent oscillators so as to be a half-integer multiple or an integer multiple of an oscillation wavelength of the injection synchronization by performing control such that an interference intensity of oscillated light of the two coherent oscillators is an extreme value with respect to a change in the optical path length between the two coherent oscillators.

According to such a configuration, for each pair of coherent oscillators, the optical path length is controlled so as to be a half-integer multiple or integer multiple of the oscillation wavelength of the injection synchronization, and, when the ising interaction is positive, the oscillation mode where a deviation between oscillation phases of two coherent oscillators is $\pi$ (the deviation may be zero depending on the definition of the sign of the ising interaction) can be easily started. On the other hand, when the ising interaction is negative, the oscillation mode where a deviation between the oscillation phases of two coherent oscillators is zero (the deviation may be $\pi$ depending on the definition of the sign of the ising interaction) can be easily started.

In the quantum computer using an ising model according to the present disclosure, control of the oscillation frequency of each coherent oscillator in each oscillation frequency control unit, control of the optical path length between two coherent oscillators in each inter-coherent oscillator optical path length control unit, and measurement of the pseudo ising spins of the plurality of the coherent oscillators in the oscillation phase measuring unit are performed in the mentioned order.

According to such a configuration, as the whole quantum computer using the ising model, one oscillation mode is assured to be integrally started, and the ising interaction can be correctly implemented, whereby the ising model can be correctly computed.

The quantum computer using an ising model according to the present disclosure further includes a pumping current control unit that performs gradual increase control of pumping currents of two coherent oscillators for the two coherent oscillators performing pseudo ising interaction through each inter-coherent oscillator optical path unit in a state in which the magnitude and the sign of the pseudo ising intersection between the two coherent oscillators are implemented to be fixed values and performs fixing control of the pumping currents of the two coherent oscillators at a time point when the plurality of the coherent oscillators arrive at one integrally oscillation mode for the first time, wherein the oscillation phase measuring unit, after the plurality of the coherent oscillators arrive at one integrally oscillation mode so as to arrive at a steady state, measures the pseudo ising spins of the plurality of the coherent oscillators by measuring relative values of the oscillation phases of the plurality of the coherent oscillators with respect to the oscillation phase of the master oscillator.

According to such a configuration, the state of the computer can correctly arrive at the ground state of the ising model without being incorrectly trapped into the quasi-stable state of the ising model.

The quantum computer using an ising model according to the present disclosure further includes an adjacent ising spin direction fixing unit that is arranged in each master oscillator-to-coherent oscillator optical path unit, and, for two coherent oscillators performing pseudo ising interaction through each inter-coherent oscillator optical path unit, by controlling the intensity and the phase of light injected into the two coherent oscillators when relative values of the oscillation phases of the two coherent oscillators with respect to the oscillation phase of the master oscillator are not measured to be meaningful, fixes the directions of pseudo ising spins of the two coherent oscillators to be different from each other when the sign of the pseudo ising interaction between the two coherent oscillators is implemented to be positive and fixes the directions of the pseudo ising spins of the two coherent oscillators to be the same when the sign of the pseudo ising interaction between the two coherent oscillators is implemented to be negative.

According to such a configuration, between two coherent oscillators performing pseudo ising interaction, the frustration of a pseudo spin can be resolved.

The quantum computer using an ising model according to the present disclosure further includes a peripheral ising spin direction fixing unit that is arranged in each master oscillator-to-coherent oscillator optical path unit, and, for two coherent oscillators performing pseudo ising interaction through each inter-coherent oscillator optical path unit, by controlling the intensity and the phase of light injected into an adjacent coherent oscillator performing pseudo ising interaction with the two coherent oscillators through another inter-coherent oscillator optical path unit when relative values of the oscillation phases of the two coherent oscillators with respect to the oscillation phase of the master oscillator are not measured to be meaningful, fixes the direction of the pseudo ising spin of the adjacent coherent oscillator to a direction of a current time point during computation.

According to such a configuration, between two coherent oscillators performing pseudo ising interaction, when the frustration of the pseudo spin is resolved, unintentional flipping of the pseudo spin can be prevented in the coherent oscillators that are adjacent to the two coherent oscillators in a pseudo manner.

In the quantum computer using an ising model according to the present disclosure, a delay time of the pseudo ising interaction between two coherent oscillators performing pseudo ising interaction through each inter-coherent oscillator optical path unit is shorter than the reciprocal of the injection locking width in the master oscillator and the two coherent oscillators.

According to such a configuration, the quantum computer using the ising model can be operated in a stable manner.

In the quantum computer using an ising model according to the present disclosure, the plurality of the coherent oscillators are a plurality of slave lasers.

According to such a configuration, the whole system can be operated not at a low temperature but at a room temperature.

In the quantum computer using an ising model according to the present disclosure, the plurality of the coherent oscillators are a plurality of Bose-Einstein condensates.

According to such a configuration, a quantum computer and quantum computing using an ising model can be realized using the Bose-Einstein condensates.

In the quantum computer using an ising model according to the present disclosure, the master oscillator is a master laser.

According to such a configuration, a quantum computer and quantum computing using an ising model can be realized using the master laser.

Effect of the Disclosure

The present disclosure can provide a computer and computing for suppressing exponential divergence of the computation time of an NP-complete problem or the like mapped into an ising model.

BRIEF DESCRIPTION OF THE DRAWINGS

FIG. 21(b) is a diagram that illustrates a case where the frustration of a spin is correctly resolved;

DETAILED DESCRIPTION OF THE PREFERRED EMBODIMENT

Figure 1:
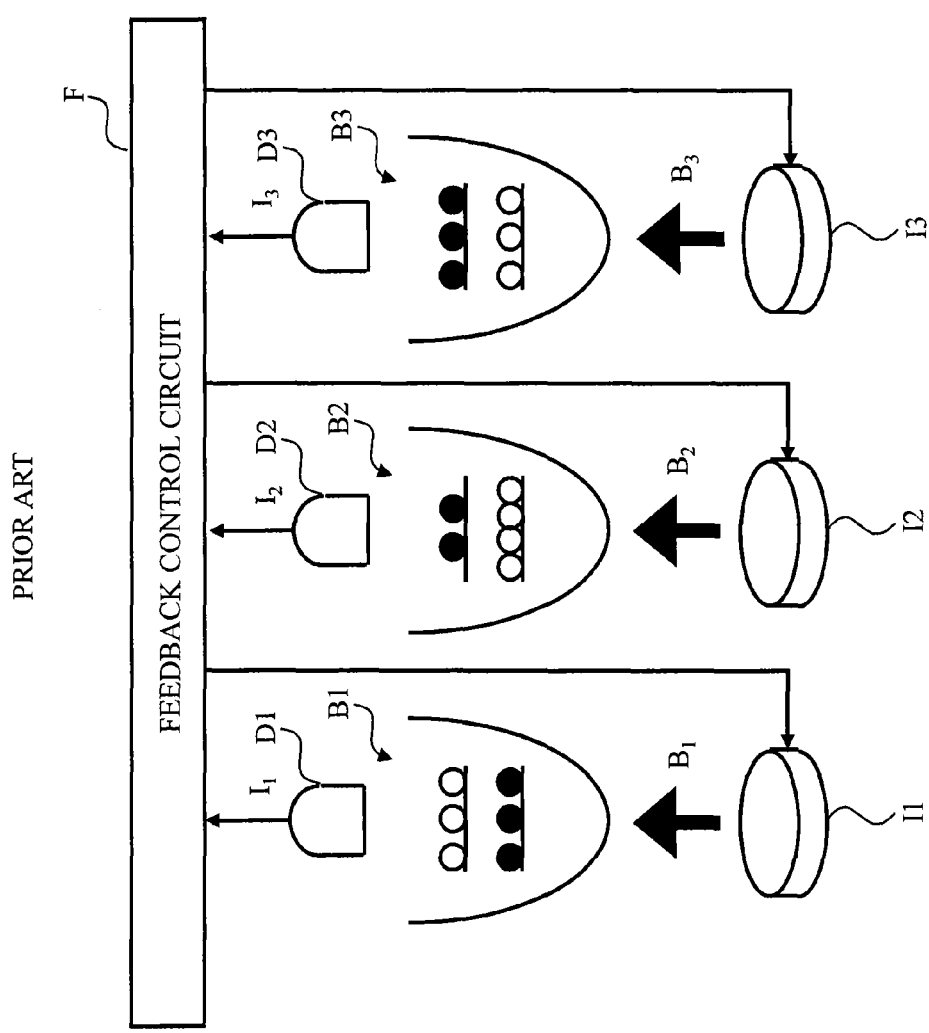
FIG. 1 is a diagram that illustrates the configuration of an ising model computer according to a conventional technology.

Embodiments of the present disclosure will be described with reference to the accompanying drawings. The embodiments to be described hereinafter are examples of embodiments of the present disclosure, and the present disclosure is not limited to the following embodiments. In this specification and the drawings, like reference numerals denote like elements.

(Configuration and Principle of Ising Model Computer)

An NP-complete problem can be substituted by an ising model of a magnetic body, and the ising model of a magnetic body can be substituted by a network of a laser.

Here, in the ising model of a magnetic body, in a pair of atoms interacting with each other, the directions of spins tend to be oriented in opposite directions (in the case of interaction of antiferromagnetism) or in the same direction (in the case of interaction of ferromagnetism) such that the energy of spin alignment is the lowest.

On the other hand, in a network of lasers, in a pair of lasers interacting with each other, the phases of light emission tend to be opposite phases (in the case of interaction of antiferromagnetism) or the same phase (in the case of interaction of ferromagnetism) such that the threshold gain of the oscillation mode is the lowest.

As above, in a system configured by one pair of lasers, the phases of light emission can be optimized such that the threshold gain of the oscillation mode is the lowest. In a system configured by many pairs of lasers, when, in a case where the phases of light emission are optimized for a "certain" pair of lasers, the phases of light emission cannot be optimized for "the other" pairs of lasers, a "point of compromise" of the phases of light emission as a "whole" of the network of lasers is searched for.

In a case where the phases of light emission are optimized as a whole of the network of lasers, it is necessary to achieve synchronization between lasers such that individual oscillation modes for pairs of lasers are not started, but one oscillation mode is started as a whole of the network of lasers.

More specifically, by injecting light having polarization (for example, vertically linear polarized light |V>) that is polarized in a predetermined direction from a master (control side) laser to each slave (controlled side) laser (a constituent element of the network of lasers), injection synchronization among lasers is achieved.

Then, it is measured whether the phase of the polarized light (for example, vertically linear polarized light |V>), which is polarized in the above-described predetermined direction, emitted from each slave laser leads before or lags after the phase of the polarized light (for example, vertically linear polarized light |V>), which is polarized in the above-described predetermined direction, emitted from the master laser. In addition, it is determined whether, in each pair of slave lasers, a state in which both lasers have lead phases or lag phases, or a state in which one laser has a lead phase and the other laser has a lag phase, is realized.

At last, the direction (upward or downward) of the spin at each atom position corresponding to each slave laser is determined, and, finally, the NP-complete problem is solved. Here, in each pair of slave lasers, when both lasers have lead phases or lag phases, in each corresponding pair of atoms, the directions of spins are the same. On the other hand, in each pair of slave lasers, when one laser has a lead phase but the other laser has a lag phase, in each corresponding pair of atoms, the directions of spins are opposite to each other.

Figure 2:
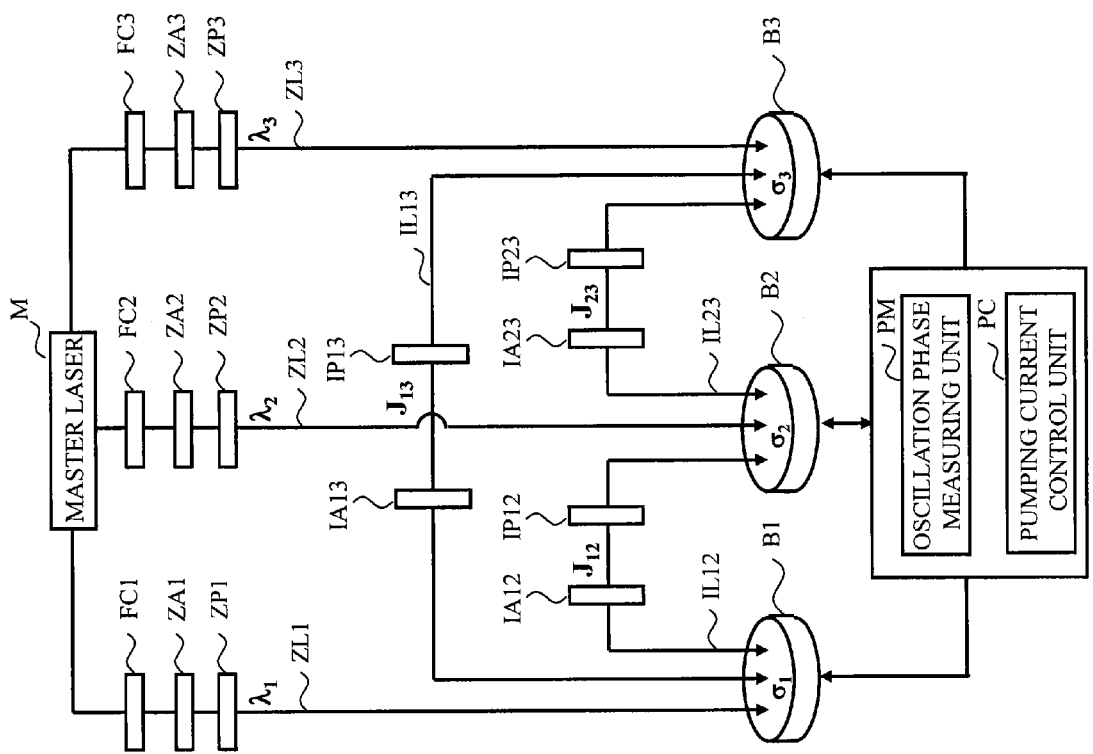
FIG. 2 is a diagram that illustrates the configuration of an ising model computer according to the present disclosure.

Next, a computer will be described. The configuration of an ising model computer is illustrated in FIG. 2. The ising model computer is configured by: slave lasers or Bose-Einstein condensing units B1, B2, and B3; a master laser M; master-to-slave optical path units ZL1, ZL2, and ZL3; inter-slave optical path units IL12, IL23, and IL13; oscillation frequency control units FC1, FC2, and FC3; inter-slave intensity control units IA12, IA23, and IA13; inter-slave optical path length control units IP12, IP23, and IP13; master-to-slave intensity control units ZA1, ZA2, and ZA3; master-to-slave phase control units ZP1, ZP2, and ZP3; an oscillation phase measuring unit PM; and a pumping current control unit PC.

The slave lasers or the Bose-Einstein condensing units B1, B2, and B3 oscillate light having polarization (for example, vertically linear polarized light |V>) polarized in the same direction determined in advance in accordance with a plurality of sites of the ising model. The master laser M performs injection synchronization for the slave lasers or the Bose-Einstein condensing units B1, B2, and B3 and oscillates light having polarization (for example, vertically linear polarized light |V>) polarized in the same direction determined in advance.

Here, a photon or an exciton polariton is a Bose particle. As the slave lasers B1, B2, and B3 using photons, semiconductor surface-emitting lasers may be applied. In addition, as the Bose-Einstein condensing units B1, B2, and B3 using the exciton polaritons, semiconductor micro-cavities can be applied. Hereinafter, while the operations of the slave lasers B1, B2, and B3 using photons will be described, the operations of the Bose-Einstein condensing units B1, B2, and B3 using the exciton polaritons are similar thereto.

The master-to-slave optical path unit ZL1 is arranged between the master laser M and the slave laser B1. In addition, the master-to-slave optical path unit ZL2 is arranged between the master laser M and the slave laser B2. The master-to-slave optical path unit ZL3 is arranged between the master laser M and the slave laser B3.

The inter-slave optical path unit IL12 is arranged between the slave lasers B1 and B2. In addition, the inter-slave optical path unit IL23 is arranged between the slave lasers B2 and B3. The inter-slave optical path unit IL13 is arranged between the slave lasers B1 and B3.

Here, the master-to-slave optical path unit ZL and the inter-slave optical path unit IL may share a path. In such a case, beam splitters may be arranged at branching positions of the master-to-slave optical path unit ZL and the inter-slave optical path unit IL.

The oscillation frequency control unit FC1 is arranged in the master-to-slave optical path unit ZL1 and controls the oscillation frequency of the slave laser B1 so as to be the oscillation frequency of the master laser M. In addition, the oscillation frequency control unit FC2 is arranged in the master-to-slave optical path unit ZL2 and controls the oscillation frequency of the slave laser B2 so as to be the oscillation frequency of the master laser M. The oscillation frequency control unit FC3 is arranged in the master-to-slave optical path unit ZL3 and controls the oscillation frequency of the slave laser B3 so as to be the oscillation frequency of the master laser M. The oscillation frequency control units FC1, FC2, and FC3 will be described later with reference to FIGS. 7 to 12.

The inter-slave intensity control unit IA12 is arranged in the inter-slave optical path unit IL12 and implements the magnitude of pseudo ising interaction $J_{12}$ between two slave lasers B1 and B2 by controlling the intensity of light exchanged between the two slave lasers B1 and B2. In addition, the inter-slave intensity control unit IA23 is arranged in the inter-slave optical path unit IL23 and implements the magnitude of pseudo ising interaction $J_{23}$ between two slave lasers B2 and B3 by controlling the intensity of light exchanged between the two slave lasers B2 and B3. The inter-slave intensity control unit IA13 is arranged in the inter-slave optical path unit IL13 and implements the magnitude of pseudo ising interaction $J_{13}$ between two slave lasers B1 and B3 by controlling the intensity of light exchanged between the two slave lasers B1 and B3. As the inter-slave intensity control units IA12, IA23, and IA13, for example, attenuation plates or the like may be applied.

The inter-slave optical path length control unit IP12 is arranged in the inter-slave optical path unit IL12 and implements the sign of the pseudo ising interaction $J_{12}$ between the two slave lasers B1 and B2 by controlling the optical path length between the two slave lasers B1 and B2. In addition, the inter-slave optical path length control unit IP23 is arranged in the inter-slave optical path unit IL23 and implements the sign of the pseudo ising interaction $J_{23}$ between the two slave lasers B2 and B3 by controlling the optical path length between the two slave lasers B2 and B3. The inter-slave optical path length control unit IP13 is arranged in the inter-slave optical path unit IL13 and implements the sign of the pseudo ising interaction $J_{13}$ between the two slave lasers B1 and B3 by controlling the optical path length between the two slave lasers B1 and B3. The inter-slave optical path length control units IP12, IP23, and IP13 will be described later with reference to FIGS. 13, 14(a) and 14(b).

The master-to-slave intensity control unit ZA1 is arranged in the master-to-slave optical path unit ZL1 and implements the magnitude of pseudo Zeeman energy $\lambda_1$ of the slave laser B1 by controlling the intensity of light injected to the slave laser B1. In addition, the master-to-slave intensity control unit ZA2 is arranged in the master-to-slave optical path unit ZL2 and implements the magnitude of pseudo Zeeman energy $\lambda_2$ of the slave laser B2 by controlling the intensity of light injected to the slave laser B2. The master-to-slave intensity control unit ZA3 is arranged in the master-to-slave optical path unit ZL3 and implements the magnitude of pseudo Zeeman energy $\lambda_3$ of the slave laser B3 by controlling the intensity of light injected to the slave laser B3. As the master-to-slave intensity control units ZA1, ZA2, and ZA3, for example, attenuation plates or the like may be applied.

The master-to-slave phase control unit ZP1 is arranged in the master-to-slave optical path unit ZL1 and implements the sign of the pseudo Zeeman energy X of the slave laser B1 by controlling the phase of the light injected to the slave laser B1. In addition, the master-to-slave phase control unit ZP2 is arranged in the master-to-slave optical path unit ZL2 and implements the sign of the pseudo Zeeman energy $\lambda_2$ of the slave laser B2 by controlling the phase of the light injected to the slave laser B2. The master-to-slave phase control unit ZP3 is arranged in the master-to-slave optical path unit ZL3 and implements the sign of the pseudo Zeeman energy $\lambda_3$ of the slave laser B3 by controlling the phase of the light injected to the slave laser B3. As the configuration of the master-to-slave phase control units ZP1, ZP2, and ZP3, for example, any one of configurations illustrated as in FIGS. 13, 14(a) and 14(b) and the like may be applied.

After a plurality of the slave lasers B1, B2, and B3 arrive at a steady state, the oscillation phase measuring unit PM measures relative values of the oscillation phases of the plurality of the slave lasers B1, B2, and B3 with respect to the oscillation phase of the master laser M, thereby measuring pseudo ising spins $\sigma_1$, $\sigma_2$, and $\sigma_3$ of the plurality of slave lasers B1, B2, and B3. The oscillation phase measuring unit PM and the pumping current control unit PC will be described later with reference to FIGS. 3 and 18.

Next, the calculation principle will be described. Ising Hamiltonian is acquired using Numerical Expression 4.

[Numerical Expression 4]
$$H = \sum_{i,j=1}^{M} J_{ij} S_i S_j + \sum_{i=1}^{M} \lambda_i S_i$$

Here, in Numerical Expression 4, a sign attached prior to $J_{ij}$ is "+". Accordingly, when $J_{ij}$ is positive, antiferromagnetic interaction works between $S_i$ and $S_j$. On the other hand, when $J_{ij}$ is negative, ferromagnetic interaction works between $S_i$ and $S_j$. However, the sign attached prior to $J_{ij}$ may be "−". In such a case, when $J_{ij}$ is positive, ferromagnetic interaction works between $S_i$ and $S_j$ and, when $J_{ij}$ is negative, antiferromagnetic interaction works between $S_i$ and $S_j$.

In addition, in Numerical Expression 4, the sign attached prior to $\lambda_i$ is "+". Accordingly, when $\lambda_i$ is positive, it is easy for $S_i$ to take a downward spin "−1". On the other hand, when $\lambda_i$ is negative, it is easy for $S_i$ to take an upward spin "+1". However, the sign attached prior to $\lambda_i$ may be "−". In such a case, when $\lambda_i$ is positive, it is easy for $S_i$ to take an upward spin "+1", and, when $\lambda_i$ is negative, it is easy for $S_i$ to take a downward spin "−1".

As the above-described direction of the polarized light that is determined in advance, vertically linear polarized light |V> is selected. In each one of the slave lasers B1, B2, and B3, rate equations for oscillation intensity $A_{Vi}(t)$, an oscillation phase $\phi_{Vi}(t)$, and an inverted population number difference $N_{Ci}(t)$ of carriers are as in Numerical Expressions 5 to 8.

[Numerical Expression 5]
$$\frac{d}{dt} A_{Vi}(t) = -\frac{1}{2}\left\{\frac{\omega}{Q} - E_{CVi}(t)\right\} A_{Vi}(t) + \frac{\omega}{Q}\sqrt{n_M}\{\varsigma\cos\phi_{Vi}(t) - \eta_i\sin\phi_{Vi}(t)\} - \frac{\omega}{Q}\sum_{j\neq i}\frac{1}{2}\xi_{ij} A_{Vj}(t)\cos\{\phi_{Vj}(t) - \phi_{Vi}(t)\}] + F_{AV}$$

[Numerical Expression 6]
$$\frac{d}{dt}\phi_{Vi}(t) = \frac{1}{A_{Vj}(t)}\left[\frac{\omega}{Q}\sqrt{n_M}\left\{\begin{array}{c}-\varsigma\sin\phi_{Vi}(t)-\\ \eta_i\cos\phi_{Vi}(t)\end{array}\right\} - \frac{\omega}{Q}\sum_{j\neq i}\frac{1}{2}\xi_{ij}A_{Vj}(t)\sin\left\{\begin{array}{c}\phi_{Vj}(t)-\\ \phi_{Vi}(t)\end{array}\right\}\right] + F_{AV}$$

[Numerical Expression 7]
$$\frac{d}{dt} N_{Ci}(t) = P - \frac{N_{Ci}(t)}{\tau_{sp}} - E_{CVi}(t)\{A_{Vi}^2(t) + 1\} + F_N$$

[Numerical Expression 8]
$$E_{CVi}(t) = \beta\frac{N_{Ci}(t)}{\tau_{sp}}$$

Here, ω is an oscillation frequency, and Q is a Q factor of resonator of the master laser M and each slave laser B. $n_M$ is the number of photons supplied from the master laser M. P is the number of electrons injected to each slave laser B per second for realizing inverter population, in other words, the pumping rate. $-(½)(\omega/Q)A_{Vi}(t)$ illustrated in Numerical Expression 5 represents the decreasing rate of the oscillation intensity $A_{Vi}(t)$ according to elapse of time that is caused by a resonator loss.

$\tau_{sp}$ is an electron lifetime according to spontaneous emission toward another oscillation mode other than a laser oscillation mode. β is a coupling constant of all the light that is spontaneously emitted for the laser oscillation mode and is about $10^{-4}$ to $10^{-5}$ in the case of a semiconductor surface-emitting laser. $(½)E_{CVi}(t)A_{Vi}(t)$ illustrated in Numerical Expression 5 represents the increasing rate of the oscillation intensity $A_{Vi}(t)$ according to elapse of time that is caused by stimulated emission. In addition, $E_{CVi}(t)$ illustrated in Numerical Expression 5 represents the increasing rate of the oscillation intensity $A_{Vi}(t)$ according to elapse of time that is caused by spontaneous emission.

The injection phase of each slave laser B deviates from the oscillation phase of the master laser M. In light injected to each slave laser B, it is assumed that the intensity of a component having the same phase as the oscillation phase of the mater laser M is in proportion to $\zeta$, and the intensity of a component having a phase deviating from the oscillation phase of the master laser M by $\pi/2$ is in proportion to $\eta_i$.

A term to which $\zeta$ and $\eta_i$ relate in Numerical Expression 5 is a term relating to Zeeman energy. $(\omega/Q)\sqrt{n_M}\{\zeta \cos \phi_{Vi}(t) - \eta_i \sin \phi_{Vi}(t)\}$ illustrated in Numerical Expression 5 represents the change rate of the oscillation intensity $A_{Vi}(t)$ according to elapse of time in the i-th site when light is injected from the master laser M to the i-th site.

A term to which $\zeta$ and $\eta_i$ relate in Numerical Expression 6 is a term relating to Zeeman energy. $(1/A_{Vi}(t))(\omega/Q)\sqrt{n_M}\{-\zeta \sin \phi_{Vi}(t) - \eta_i \cos \phi_{Vi}(t)\}$ illustrated in Numerical Expression 6 represents the change rate of the oscillation phase $\phi_{Vi}(t)$ according to elapse of time in the i-th site when light is injected from the master laser M to the i-th site.

In addition, terms to which $\zeta$ relates in Numerical Expressions 5 and 6 relate to injection for injection synchronization of laser before the start of computation (t<0) and after the start of computation (t>0) but do not directly relate to the magnitude and the sign of the Zeeman energy. Furthermore, terms to which $\eta_i$ relates in Numerical Expressions 5 and 6 relate to injection for implementing Zeeman energy after the start of computation (t>0).

A term to which $\xi_{ij}$ relates in Numerical Expression 5 relates to mutually injected light between slave lasers B for implementing ising interaction. $-(\omega/Q)(\frac{1}{2})\xi_{ij}A_{Vj}(t)\cos \{\phi_{Vj}(t) - \phi_{Vi}(t)\}$ illustrated in Numerical Expression 5 represents the change rate of the oscillation intensity $A_{Vi}(t)$ according to elapse of time in the i-th site when light is injected from the j-th site to the i-th site. $\Sigma(j \neq i)$ illustrated in Numerical Expression 5 represents contributions made from all the sites (the j-th site) other than the i-th site in the i-th site.

A term to which $\xi_{ij}$ relates in Numerical Expression 6 relates to mutually injected light between slave lasers B for implementing ising interaction. $-(1/A_{Vi}(t))(\omega/Q)(\frac{1}{2})\xi_{ij}A_{Vj}(t) \sin \{\phi_{Vj}(t) - \phi_{Vi}(t)\}$ illustrated in Numerical Expression 6 represents the change rate of the oscillation phase $\phi_{Vi}(t)$ according to elapse of time in the i-th site when light is injected from the j-th site to the i-th site. $\Sigma(j \neq i)$ illustrated in Numerical Expression 6 represents contributions made from all the sites (the j-th site) other than the i-th site in the i-th site.

$F_{AV}$, $F_{\phi V}$, and $F_N$ represent noises in the oscillation intensity, the oscillation phase, and the inverted population number difference of the carrier in the i-th site.

In the steady state, Numerical Expression 5 can be represented as Numerical Expression 9.

[Numerical Expression 9]
$$\frac{d}{dt}A_{Vi}(t) = 0$$

By transforming Numerical Expression 9 with $F_{AV}$ being ignored, Numerical Expression 10 is formed.

[Numerical Expression 10]
$$E_{CVi}(t) = \frac{\omega}{Q} - 2\frac{\omega}{Q}\frac{\sqrt{n_M}}{A_{Vi}(t)}\zeta\cos\phi_{Vi}(t) + 2\frac{\omega}{Q}\frac{\sqrt{n_M}}{A_{Vi}(t)}\eta_i\sin\phi_{Vi}(t) + \frac{\omega}{Q}\sum_{j \neq i}\xi_{ij}\frac{A_{Vj}(t)}{A_{Vi}(t)}\cos\{\phi_{Vj}(t) - \phi_{Vi}(t)\}$$

Here, when $\sigma_i$ of the ising model takes $-1$ or $+1$, $\sin \phi_{Vi}$ represented in Numerical Expression 10 takes a value in the range of $-1$ to $+1$. Thus, when it is set $\sigma_i = \sin \phi_{Vi}$ in consideration of the similarity between the ising model and the laser system, Numerical Expression 10 can be represented as Numerical Expression 11.

[Numerical Expression 11]
$$E_{CVi}(t) = \frac{\omega}{Q} - 2\frac{\omega}{Q}\frac{\sqrt{n_M}}{A_{Vi}(t)}\zeta\cos\phi_{Vi}(t) + 2\frac{\omega}{Q}\frac{\sqrt{n_M}}{A_{Vi}(t)}\eta_i\sigma_i + \frac{\omega}{Q}\sum_{j \neq i}\xi_{ij}\frac{A_{Vj}(t)}{A_{Vi}(t)}\{\cos\phi_{Vi}(t)\cos\phi_{Vj}(t) + \sigma_i\sigma_j\}$$

By adding Numerical Expression 11 for all the M sites, Numerical Expression 12 is acquired and is represented as a threshold gain $\Sigma E_{CVi}$ of the whole laser system.

[Numerical Expression 12]
$$\sum_i E_{CVi}(t) = 2\frac{\omega}{Q}\left[\frac{M}{2} - \sum_i \frac{\sqrt{n_M}}{A_{Vi}(t)}\zeta\cos\phi_{Vi}(t) + \sum_i \frac{\sqrt{n_M}}{A_{Vi}(t)}\eta_i\sigma_i + \sum_{i<j}\xi_{ij}\frac{A_{Vj}(t)}{A_{Vi}(t)}\{\cos\phi_{Vi}(t)\cos\phi_{Vj}(t) + \sigma_i\sigma_j\}\right]$$

Here, since the master laser M performs injection synchronization for each slave laser B, it can be set $A_{Vi}(t) \sim A_{Vj}(t) \sim \sqrt{n_M}$. Then, in the above-described definition $\sigma_i = \sin \phi_{Vi}$, $\sigma_i = \pm 1$, and accordingly, it can be set $\phi_{Vi} \sim \phi_{Vj} \sim \pm\pi/2$. In such a case, Numerical Expression 12 is formed as Numerical Expression 13.

[Numerical Expression 13]
$$\sum_i E_{CVi}(t) = 2\frac{\omega}{Q}\left\{\frac{M}{2} + \sum_i \eta_i\sigma_i + \sum_{i<j}\xi_{ij}\sigma_i\sigma_j\right\}$$

Here, in a case where each slave laser B has a uniform medium, an oscillation phase state $\{\sigma_i\}$ implementing a minimum threshold gain $\Sigma E_{CVi}$ as the whole laser system is selected. In other words, one specific oscillation mode is selected as the whole laser system. Then, owing to competition between oscillation modes, one specific oscillation mode suppresses the other oscillation modes.

In other words, $\Sigma E_{CVi}$ illustrated in Numerical Expression 13 is minimized as the whole laser system. On the other hand, $(\omega/Q)M$ represented in Numerical Expression 13 is constant as the whole laser system. Accordingly, $\Sigma\eta_i\sigma_i + \Sigma\xi_{ij}\sigma_i\sigma_j$ represented in Numerical Expression 13 is minimized as the whole laser system.

By putting $\xi_{ij}=J_{ij}$ and $\eta_i=\lambda_i$, when $\Sigma\eta_i\sigma_i+\Sigma\xi_{ij}\sigma_i\sigma_j$ is minimized as the whole laser system, $\Sigma\lambda_i\sigma_i+\Sigma J_{ij}\sigma_i\sigma_j$ is minimized as well. In other words, a ground state minimizing the Ising Hamiltonian is realized.

In order to improve the computation precision, it is necessary to configure a difference between a minimal threshold gain and a next minimal threshold gain to be sufficiently larger than $\beta(\omega/Q)(1/R)$ that is a difference between a saturation gain $E_{CV}$ determined based on the spontaneous emission rate and the photon attenuation rate $\omega/Q$ for a laser oscillation mode of the whole laser system. Here, $R=I/I_{th}-1$ is a standardized pumping rate, and I and $I_{th}$ are an injection current and a threshold of the laser oscillation thereof. Accordingly, by decreasing $\beta$ and increasing R, the computation precision can be improved.

Figure 3:
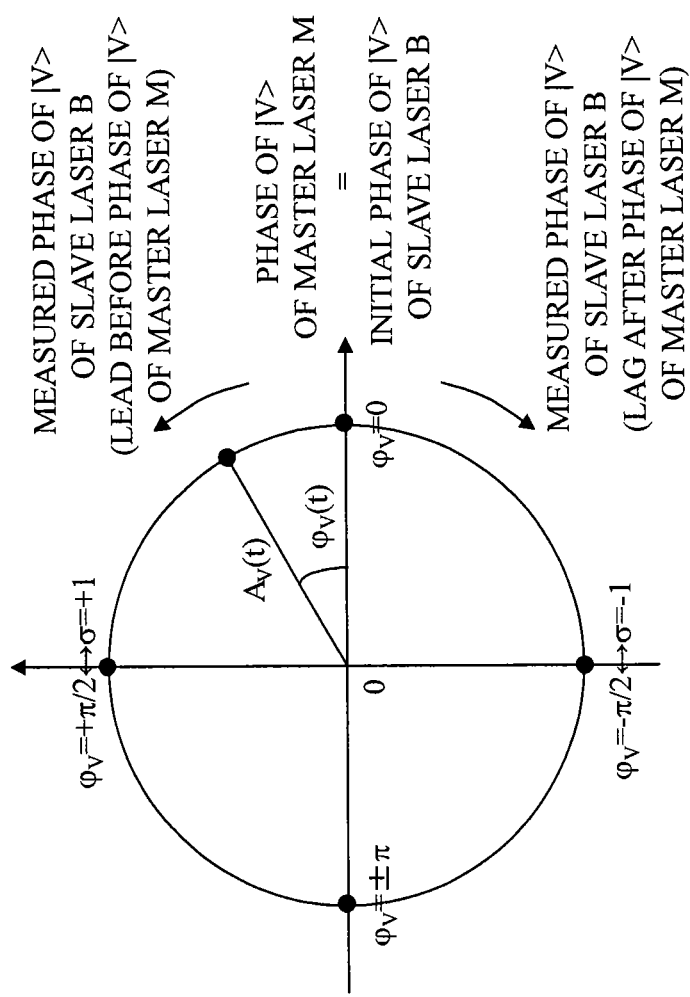
FIG. 3 is a diagram that illustrates the principle of the ising model computer according to the present disclosure.

Next, the principle of the computation will be summarized. The principle of the ising model computer according to the present disclosure is illustrated in FIG. 3. The oscillation phase of the vertically linear polarized light |V> of the master laser M does not change from the initial state to a steady state. The oscillation phase of the vertically linear polarized light |V> of each slave laser B is $\phi_V(t)=0$ that is the same as that of the vertically linear polarized light |V> of the master laser M in the initial state. In addition, in the steady state, the oscillation phase of the vertically linear polarized light of each slave laser B is $\phi_V(t)=\pm\pi/2$ deviated from the oscillation phase of the vertically linear polarized light |V> of the master laser M. Here, $\phi_V=\pm\pi/2$ is associated with to $\sigma=\pm1$ (double signs in the same order).

For each pair of slave lasers B, when the ising interaction $J_{ij}$ is positive, it is advantageous from the viewpoint of energy that the pseudo spins a of the two slave lasers B have mutually different signs. In other words, an oscillation mode, in which the oscillation phases $\phi_V$ of the two slave lasers B have mutually-different signs and have a deviation of $\pi$ therebetween, is configured to be easily started. Thus, as will be described later with reference to FIGS. 13, 14(*a*) and 14(*b*), each inter-slave optical path length control unit IP controls the optical path length between two slave lasers B so as to be a half-integer multiple of the oscillation wavelength of the injection synchronization.

For each pair of slave lasers B, when the ising interaction $J_{ij}$ is negative, it is advantageous from the viewpoint of energy that the pseudo spins a of the two slave lasers B have mutually the same sign. In other words, an oscillation mode, in which the oscillation phases $\phi_V$ of the two slave lasers B have the same sign and have a deviation of zero therebetween, is configured to be easily started. Thus, as will be described later with reference to FIGS. 13, 14(*a*) and 14(*b*), each inter-slave optical path length control unit IP controls the optical path length between two slave lasers B so as to be an integer multiple of the oscillation wavelength of the injection synchronization.

For each slave laser B, when the Zeeman energy $\lambda_i$ is positive, it is advantageous from the viewpoint of energy that the pseudo spin $\sigma$ of the slave laser B is −1. In other words, an oscillation mode, in which the oscillation phase $\phi_V$ of the slave laser B is $-\pi/2$, is configured to be easily started. Accordingly, for components (terms to which $\eta_i$ represented in Numerical Expressions 5 and 6 relates) contributing to the implementation of the Zeeman energy $\lambda i$ among light injected to each slave laser B, each master-to-slave phase control unit ZP performs control such that the injection phase for the slave laser B lags by $\pi/2$ with respect to the oscillation phase of the master laser M.

For each slave laser B, when the Zeeman energy $\lambda_i$ is negative, it is advantageous from the viewpoint of energy that the pseudo spin $\sigma$ of the slave laser B is +1. In other words, an oscillation mode, in which the oscillation phase $\phi_V$ of the slave laser B is $+\pi/2$, is configured to be easily started. Accordingly, for components (terms to which $\eta_i$ represented in Numerical Expressions 5 and 6 relates) contributing to the implementation of the Zeeman energy $\lambda_i$ among components of light injected to each slave laser B, each master-to-slave phase control unit ZP performs control such that the injection phase for the slave laser B leads by $\pi/2$ with respect to the oscillation phase of the master laser M.

Above all, in the whole ising model computer, one oscillation mode is configured to be integrally started. Thus, in each pair of slave lasers B, when there is a case where the above-described oscillation mode is actually started, there is also a case where the oscillation mode is not necessarily started.

The computing sequence of the ising model is as follows. First, when an NP complete problem or the like is mapped into the ising model, $J_{ij}$ and $\lambda_i$ are determined. Next, when the ising model is physically implemented, the magnitude and the sign of $\xi_{ij}$ are implemented in accordance with $J_{ij}$ by using each inter-slave intensity control unit IA and each inter-slave optical path length control unit IP. In addition, the magnitude and the sign of $\eta_i$ are implemented in accordance with $\lambda_i$ using each master-to-slave intensity control unit ZA and each master-to-slave phase control unit ZP.

Next, after each slave laser B reach the steady state, by measuring the oscillation phase $\phi_{Vi}$ of each slave laser B using the oscillation phase measuring unit PM, the pseudo ising spin $\sigma_i$ of each slave laser B is measured. Finally, the ground state of the ising model, which has been acquired, is mapped into a solution for the NP-complete problem or the like again.

In the above-described embodiment illustrated in FIG. 4(*a*), the oscillation phase of the vertically linear polarized light |V> of the slave laser B is $\phi_V(t)=0$ in the initial state and $\phi_V(t)=\pm\pi/2$ in the steady state, and $\phi_V=\pm\pi/2$ corresponds to $\sigma=\pm1$. Each inter-slave intensity control unit IA, each inter-slave optical path length control unit IP, each master-to-slave intensity control unit ZA, and each master-to-slave phase control unit ZP perform control so that such $\phi_V(t)$ is realized.

As a new modified example illustrated in FIG. 4(*b*), the oscillation phase of the vertically linear polarized light |V> of the slave laser B may be $\phi_V(t)\neq0$ in the initial state and $\phi_V(t)\neq\pm\pi/2$ in the steady state, and $\phi_V\neq\pm\pi/2$ may correspond to $\sigma=\pm1$. Each inter-slave intensity control unit IA, each inter-slave optical path length control unit IP, each master-to-slave intensity control unit ZA, and each master-to-slave phase control unit ZP perform control so that such $\phi_V(t)$ is realized. The point is that mutually-different $\phi_V$'s may be discriminated so as to be associated with mutually-different $\sigma$'s.

Above all, by applying the above-described embodiment illustrated in FIG. 4(*a*), the design and the production of the ising model computer can be performed more easily than those according to the new modified example illustrated in FIG. 4(*b*). In other words, in a case where directions having mutually different spins are associated with oscillation phases, which are different from each other by $\pi$, of slave lasers B, the directions of the pseudo spins can be determined with high precision, and the control of the optical path lengths of two slave lasers B based on the control of the interference intensities of the two slave lasers B can be applied easily, as will be described later with reference to FIGS. 13, 14(*a*) and 14(*b*), compared to a case where directions having mutually different pseudo spins are associated with oscillation phases, which are different from each other by an angle less than $\pi$, of slave lasers B.

Figure 4A:
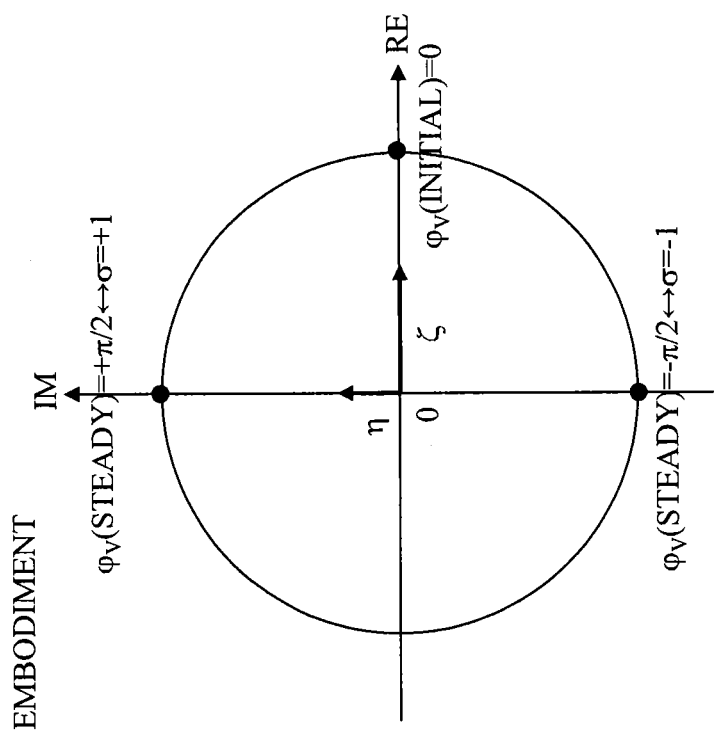
FIG. 4(a) is a diagram that illustrates an embodiment and a modified example of the ising model computer according to the present disclosure.
Figure 4B:
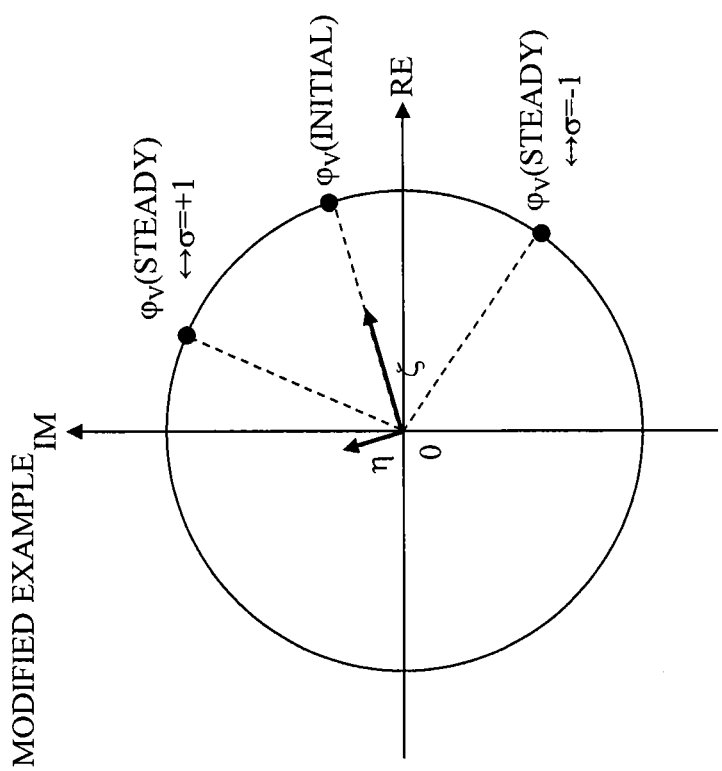
FIG. 4(b) is a diagram that illustrates an embodiment and a modified example of the ising model computer according to the present disclosure.

In the above-described embodiment illustrated in FIGS. 4(a) and 4(b), the master laser M and each slave laser B oscillate light having vertically linear polarization |V>. As a new modified example illustrated in FIGS. 4(a) and 4(b), the master laser M and each slave laser B may oscillate any one of horizontally linearly polarized light |H>, +45 degrees linearly polarized light |D>, −45 degrees linearly polarized light |Dbar>, counterclockwise circularly polarized light |L>, clockwise circularly polarized light |R>, and the like. The point is that the master laser M and each slave laser B may oscillate light having polarization that is polarized in the same direction determined in advance.

Next, simulation results of a second embodiment will be described. The simulation results of the temporal development of the oscillation phase of each site are illustrated in FIGS. 5, 6(a), 6(b), 6(c) and 6(d).

Figure 5:
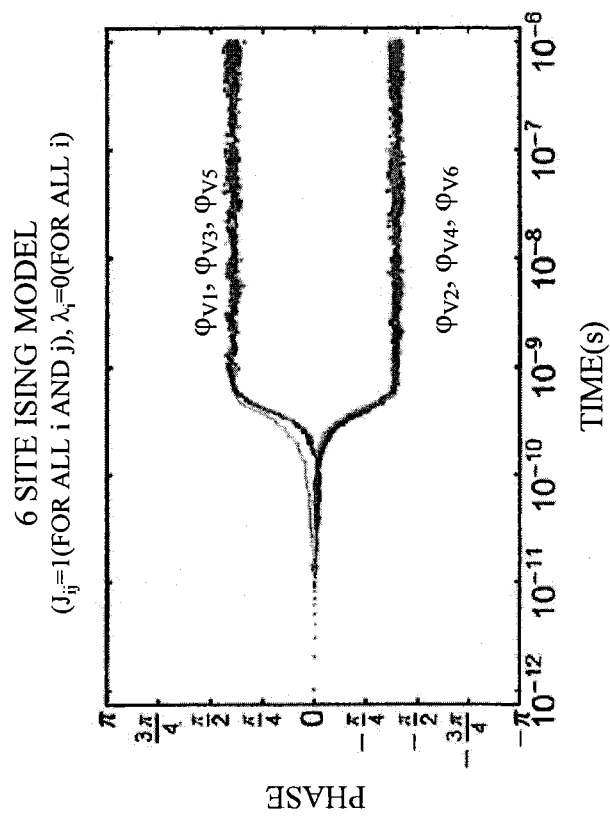
FIG. 5 is a diagram that illustrates a simulation result of temporal development of the oscillation phase of each site.

In FIG. 5, the number of sites is six and $H = \Sigma J_{ij}\sigma_i\sigma_j + \Sigma \lambda_i \sigma_i$, and $J_{ij}$ and $\lambda_i$ are as represented on the upper side of the figure. After $\sim 10^{-9}$ sec, $\phi_{Vi} \sim +\pi/2$ and $\sigma_i = +1$ in the first, third, and fifth sites, and $\phi_{Vi} \sim -\pi/2$ and $\sigma_i = -1$ in the second, fourth, and sixth sites. At $\sim 10^{-9}$ sec, a steady state is settled, and the oscillation phase measuring unit PM can start measuring $\phi_{Vi}$.

In FIGS. 6(a), 6(b), 6(c) and 6(d), while the number of sites is two and $H = \Sigma J_{ij}\sigma_i\sigma_j + \Sigma \lambda_i \sigma_i$, $J_{12} = +1$ and $\lambda_1 = \lambda_2 = 0$, and only antiferromagnetic interaction works, but Zeeman energy is not applied. $\zeta = 1/200$, $I/I_{th} = 3$, $\omega/Q = 10^{12}$ s$^{-1}$, $\tau_{sp} = 10^{-9}$ s, and $\beta = 10^{-4}$. In addition, $\alpha$ is as represented in Numerical Expression 14.

[Numerical Expression 14]

$$\xi_{ij} = \alpha \frac{J_{ij}}{\max\{J_{ij}, \lambda_i\}}, \eta_i = \alpha \frac{\lambda_i}{\max\{J_{ij}, \lambda_i\}}$$

Figure 6A:
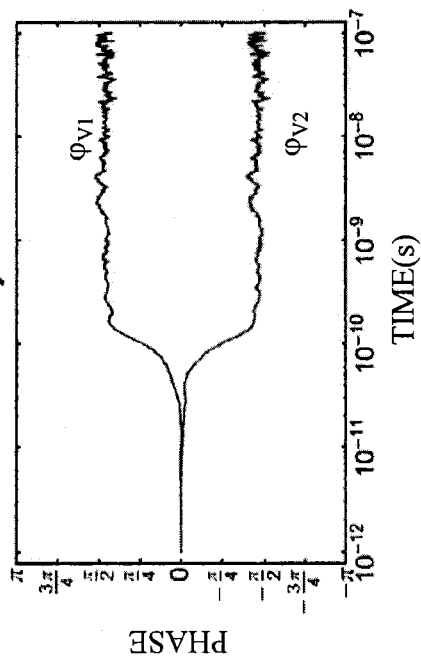
FIG. 6(a) is a diagram that illustrates a simulation result of temporal development of the oscillation phase of each site.
Figure 6B:
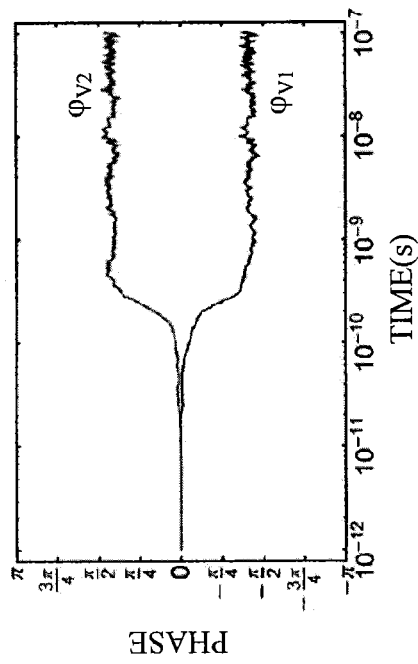
FIG. 6(b) is a diagram that illustrates a simulation result of temporal development of the oscillation phase of each site.
Figure 6C:
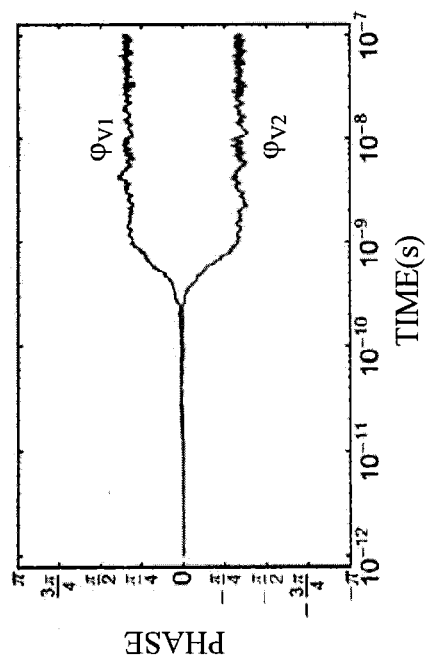
FIG. 6(c) is a diagram that illustrates a simulation result of temporal development of the oscillation phase of each site.

In a case where $\alpha = 1/25$ (FIGS. 6(a)) and 1/50 (FIG. 6(b)), after $\sim 10^{-10}$ sec, $\phi_{Vi} \sim +\pi/2$ and $\sigma_i = +1$ in the first site, and $\phi_{Vi} \sim -\pi/2$ and $\sigma_i = -1$ in the second site. In a case where $\alpha = 1/100$ (FIG. 6(c)), after $\sim 10^{-10}$ sec, it is apparent that $0 < \phi_{Vi} < +\pi/2$ and $\sigma_i = +1$ in the first site, and it is apparent that $0 > \phi_{Vi} > -\pi/2$ and $\sigma_i = +1$ in the second site.

Figure 6D:
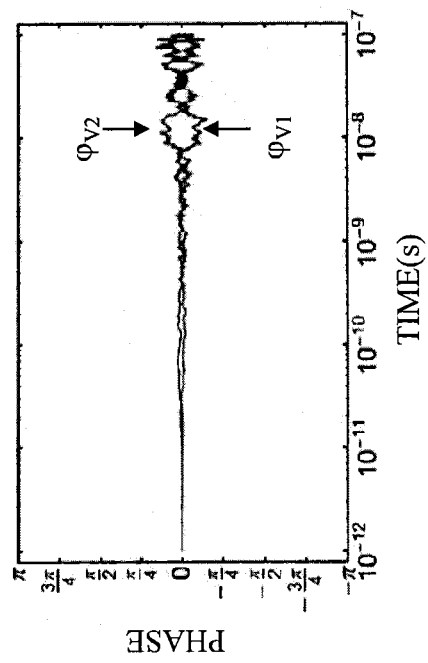
FIG. 6(d) is a diagram that illustrates a simulation result of temporal development of the oscillation phase of each site.

In a case where $\alpha = 1/200$ (FIG. 6(d)), even after $\sim 10^{-10}$ sec, $\phi_{Vi} \sim 0$ in the first and second sites, and one of $\sigma_i = \pm 1$ cannot be selected. As above, as $\alpha$ increases, a difference between $\phi_{Vi}$'s corresponding to $\sigma_i = \pm 1$ increases. More specifically, in a case where $\alpha > 4\zeta$, $\phi_{Vi} \sim \pm\pi/2$ is settled to the steady state. On the other hand, in a case where $\alpha \sim \zeta$, $\phi_{Vi}$ is not determined even in the steady state.

As described above, the oscillation phase of light emitted from the slave laser B is associated with the pseudo spin direction of the slave laser B, and the pseudo spin state of the whole system is measured. Until the pseudo spin state of the whole system is settled to the ground state, quantum coherence of the whole system is not destroyed, and accordingly, the problem of exponentially increasing the computing time in accordance with the total number of sites is solved, whereby the computing time can be shortened to a large extent.

When the number of sites is M, it is sufficient to arrange M(M−1)/2 inter-slave optical path units IL, M(M−1)/2 inter-slave intensity control units IA, and M(M−1)/2 inter-slave optical path length control units IP. Accordingly, the number of required optical devices does not increase to $2^M$ but is scaled to $M^2/2$ with respect to the number M of sites. In a case where slave lasers B are applied instead of Bose-Einstein condensates, the whole system can be operated not at a low temperature but at a room temperature.

Thus, for an arbitrary pair out of M sites, through light exchanged between two sites, not only ising interaction between sites physically located close to each other but also ising interaction between sites located far from each other can be implemented. Accordingly, regardless of a physical distance between sites, an ising model in which any NP-complete problem or the like can be mapped can be solved.

In addition, for a number of pseudo spins in each site, whether one of the upward circulation and the downward circulation is more than the other is determined based on the rule of majority. Accordingly, even when there is a pseudo spin that is leaked from the ground state to the excited state, the probability of acquiring a correct solution is markedly higher in a case where there are a number of pseudo spins than that in a case where there is one pseudo spin.

Here, as the whole system transits from the initial state to the steady state, the oscillation phase of each slave laser B deviates from the oscillation phase of the master laser M, but the oscillated polarized light of each slave laser B is constantly the same as the oscillated polarized light of the master laser M.

Thus, for each slave laser B, a differential equation of the temporal developments of only three including the oscillation intensity $A_{Vi}(t)$, the oscillation phase $\phi_{Vi}(t)$, and the inverted population number difference $N_{Ci}(t)$ of carriers may be formulated. Each slave laser B may have the single direction of oscillated polarized light, and accordingly, even in the case of a semiconductor surface emission laser (there is a slight difference in the frequency characteristics between oscillated light having vertically linear polarization and oscillated light having horizontally linear polarization) having in-plane anisotropy, the in-plane anisotropy does not matter. As above, the quantum computer using the ising model can be easily designed and manufactured.

The present disclosure can be applied to either a system in which only ising interaction is present or a system in which ising interaction and Zeeman energy are present together. In addition, according to the present disclosure, as will be described later with reference to FIGS. 19(a) and 19(b) to 25, in a system in which only ising interaction is present, when a solution is undetermined due to the occurrence of energy degeneracy of the ground state, by incorporating Zeeman energy, a solution can be determined by resolving the energy degeneracy of the ground state.

(Configuration and Principle of Oscillation Frequency Control Unit)

Each oscillation frequency control unit FC performs control of the interference intensity between oscillated light of each slave laser B and oscillated light of the master laser M to have an extreme value with respect to a change in the oscillation frequency of each slave laser B, thereby performing feedback control of the oscillation frequency of each slave laser B to be the oscillation frequency of the master laser M. Details thereof will be described as below.

Figure 7:
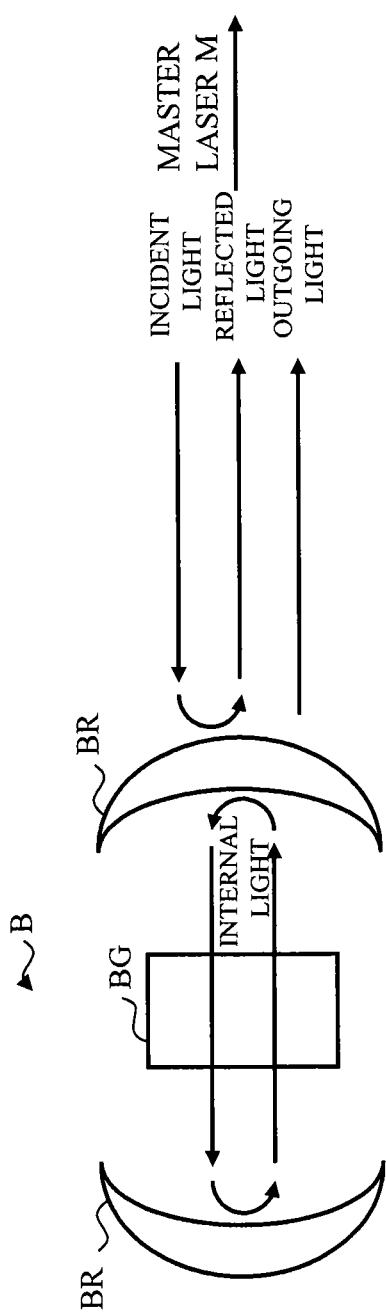
FIG. 7 is a diagram that illustrates the configuration of a slave laser.
Figure 8:
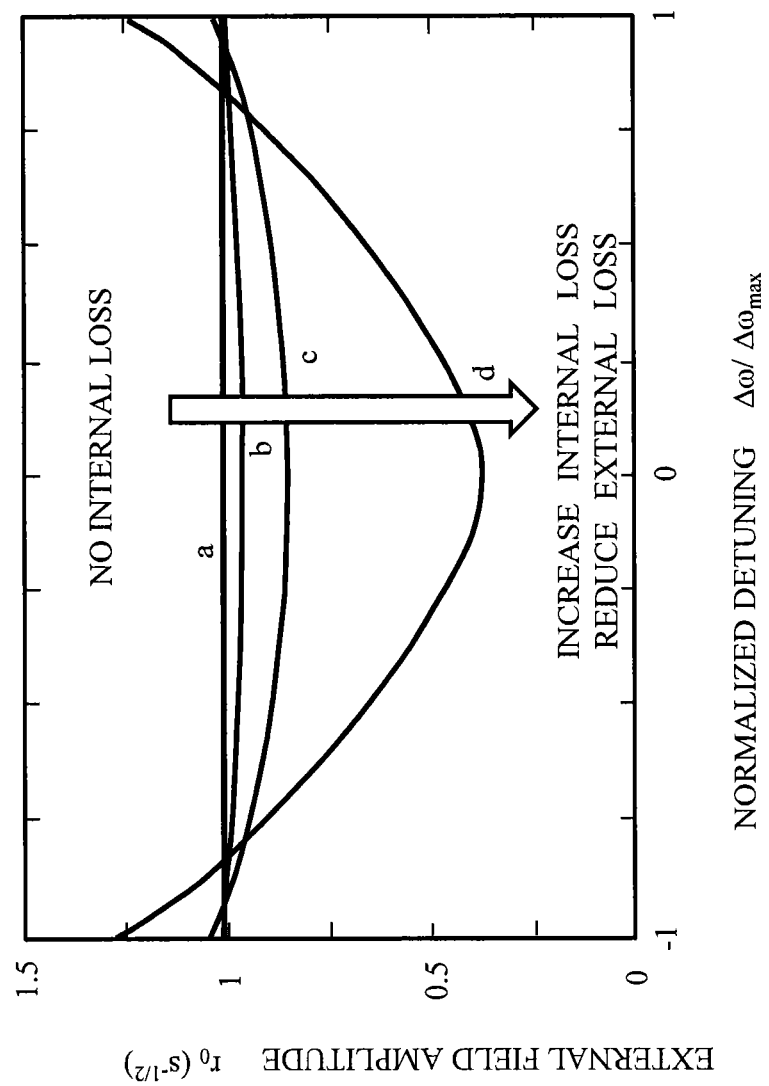
FIG. 8 is a diagram that illustrates the principle of controlling an oscillation frequency.

The configuration of the slave laser B is illustrated in FIG. 7. The principle of the oscillation frequency control is illustrated in FIG. 8. The slave laser B has incident light of a frequency $\omega_M$ being incident from the master laser M and reflects reflected light of the frequency $\omega_M$ to the master laser M on a light reflecting mirror BR that is arranged on the master laser M side. In addition, the slave laser B amplifies internal light of a frequency $\omega_S$ using an amplified medium BG in an optical resonator formed by the light reflecting mirrors BR disposed on both sides. Furthermore, the slave laser B emits an outgoing light of the frequency $\omega_S$ from the light reflecting mirror BR disposed on the master laser M side to the master laser M. In this step, the frequencies $\omega_M$ and $\omega_S$ are not necessarily synchronized.

Here, while reflected light of the frequency $\omega_M$, which is reflected from the light reflecting mirror BR arranged on the master laser M side, receives a phase change of $\pi$ at the time of being reflected, outgoing light of the frequency $\omega_S$ therefrom does not receive any phase change at the time of being transmitted. Accordingly, in a case where the frequencies $\omega_M$ and $\omega_S$ are synchronized with each other, destructive interference between the reflected light of the frequency $\omega_M$ and the outgoing light of the frequency $\omega_S$ may easily occur compared to a case where the frequencies $\omega_M$ and $\omega_S$ are not synchronized with each other. Therefore, by searching for a minimum of the total intensity of the reflected light of the frequency $\omega_M$ and the outgoing light of the frequency $\omega_S$ while sweeping the oscillation frequency $\omega_S$ of the slave laser B, the oscillation frequency $\omega_S$ of the slave laser B is controlled so as to be the oscillation frequency $\omega_M$ of the master laser M.

The vertical axis illustrated in FIG. 8 represents a total intensity of the reflected light of the frequency $\omega_M$ and the outgoing light of the frequency $\omega_S$. In addition, the horizontal axis illustrated in FIG. 8 represents the degree of deviation of the frequency $\omega_S$ from the frequency $\omega_M$. In other words, "0" on the horizontal axis illustrated in FIG. 8 represents that the frequencies $\omega_M$ and $\omega_S$ are synchronized with each other.

Here, $\Delta\omega$ and $\Delta\omega_{max}$ on the horizontal axis illustrated in FIG. 8 are as represented in Numerical Expression 15.

$$\Delta\omega = \omega_S - \omega_M, \Delta\omega_{max} = \frac{F_0}{A_0}\sqrt{\frac{\omega}{Q}}.$$  [Numerical Expression 15]

Here, $F_0$ is the amplitude of incident light, and $A_0$ is the amplitude of oscillated light of a slave laser. A range of $-1$ to $+1$ will be considered as $\Delta\omega/\Delta\omega_{max}$. The reason for this is that injection synchronization cannot be achieved when the frequency $\omega_S$ deviates from the frequency $\omega_M$ by $\Delta\omega_{max}$ or more.

As the state transits from a to d represented in FIG. 8, the internal loss of the slave laser B increases, the external loss of the slave laser B decreases, and the intensity of the outgoing light of the frequency $\omega_S$ increases. Then, at "0" on the horizontal axis illustrated in FIG. 8, which represents the synchronization between the frequencies $\omega_M$ and $\omega_S$, a minimum of the total intensity of the reflected light of the frequency $\omega_M$ and the outgoing light of the frequency $\omega_S$ appears.

Figure 9:
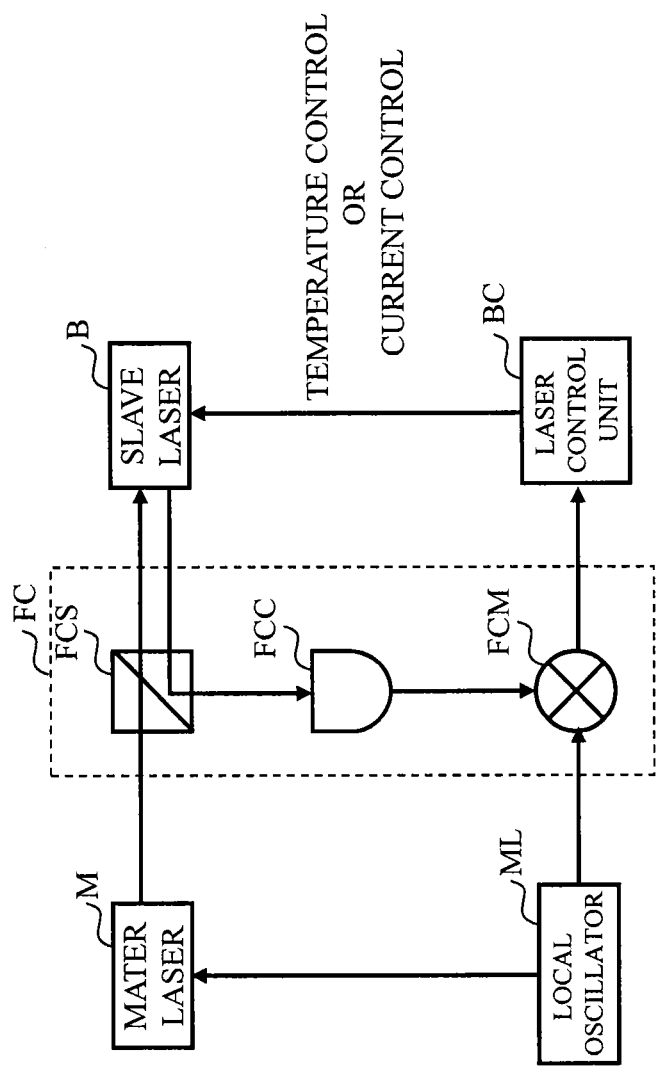
FIG. 9 is a diagram that illustrates the configuration of an oscillation frequency control unit.
Figure 10:
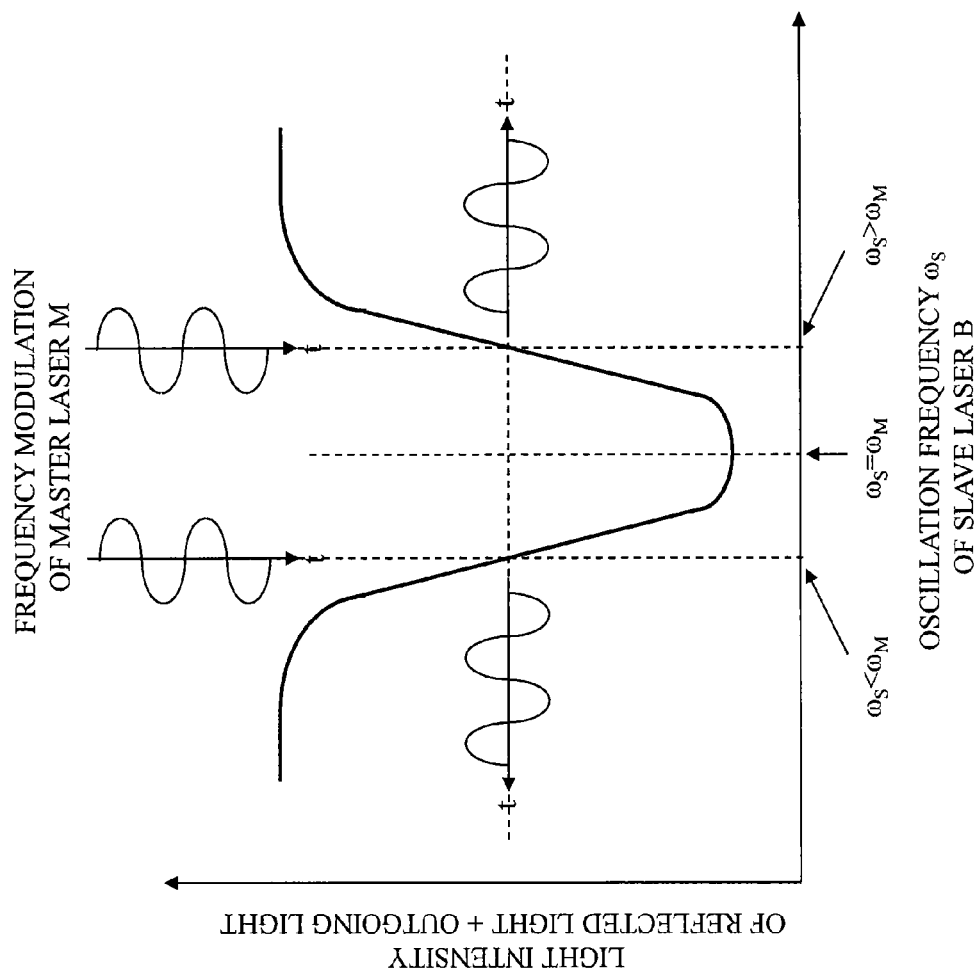
FIG. 10 is a diagram that illustrates the principle of controlling an oscillation frequency.

The configuration of the oscillation frequency control unit is illustrated in FIG. 9. In addition, the principle of the oscillation frequency control is illustrated in FIG. 10. Here, a Pound-Drever-Hall method or a frequency modulation (FM) side band method, which is a technology for stabilizing the oscillation frequency of laser, will be applied.

The oscillation frequency control unit FC is configured by an optical splitter FCS, a photodiode FCC, and a mixer circuit FCM. A local oscillator ML performs frequency modulation of a carrier signal for the master laser M. A laser control unit BC performs temperature control or current control for the slave laser B, thereby controlling the oscillation frequency $\omega_S$.

The optical splitter FCS is arranged in the master-to-slave optical path unit ZL and splits reflected light and outgoing light, which are reflected and exits from the slave laser B, from incident light that is incident to the slave laser B. The photodiode FCC performs photoelectric conversion for the output of the optical splitter FCS. The mixer circuit FCM performs synchronous detection illustrated in FIG. 10 for the output of the photodiode FCC by using the output of the local oscillator ML. As illustrated in FIG. 8, when the frequencies $\omega_M$ and $\omega_S$ are synchronized with each other, a total intensity of the reflected light of the frequency $\omega_M$ and the outgoing light of the frequency $\omega_S$ takes a minimum.

When the frequency $\omega_S$ is lower than the frequency $\omega_M$, as the frequency $\omega_S$ increases, the output of the photodiode FCC decreases. Accordingly, the output of the photodiode FCC has the same frequency and the opposite phase compared to the output of the local oscillator ML, whereby a result of the synchronous detection is negative.

On the other hand, when the frequency $\omega_S$ is higher than the frequency $\omega_M$, as the frequency $\omega_S$ increases, the output of the photodiode FCC increases. Accordingly, the output of the photodiode FCC has the same frequency and the same phase as those of the output of the local oscillator ML, whereby a result of the synchronous detection is positive.

In addition, when the frequencies $\omega_S$ and $\omega_M$ are the same, the output of the photodiode FCC is a minimum with respect to a change in the frequency $\omega_S$. Accordingly, the output of the photodiode FCC has a frequency that is twice the frequency of the output of the local oscillator ML, whereby a result of the synchronous detection is zero.

The laser control unit BC performs temperature control or current control for the slave laser B such that the result of the synchronous detection is zero, thereby controlling the oscillation frequency $\omega_S$. In addition, the frequency modulation width $\Delta\omega_M$ of the master laser M is sufficient small, compared to the above-described injection locking width $\Delta\omega_{max}$ ($\Delta\omega_M/\Delta\omega_{max}\sim0.03$). Accordingly, upon performing frequency modulation of the master laser M, there is no influence on the precision of the injection synchronization.

Figure 11:
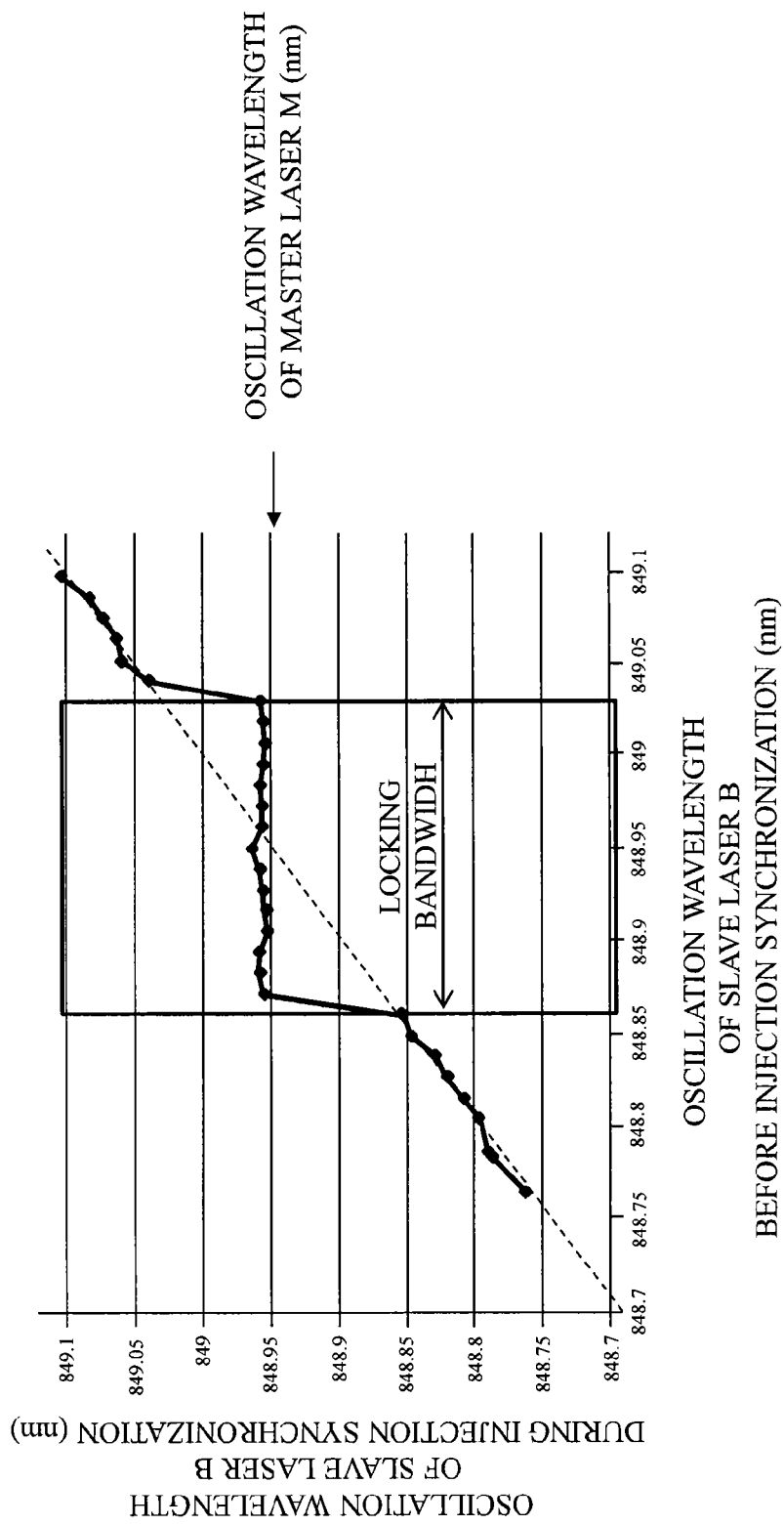
FIG. 11 is a diagram that illustrates injection locking widths of a master laser and a slave laser.
Figure 12:
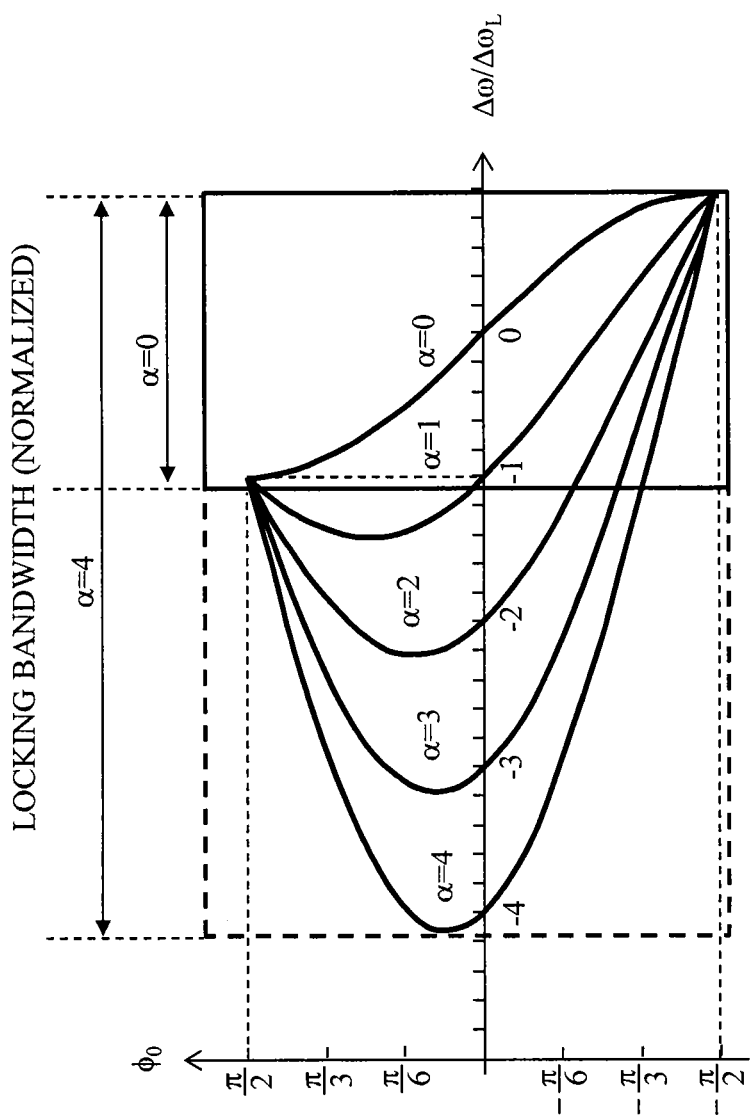
FIG. 12 is a diagram that illustrates injection locking widths of a master laser and a slave laser.

The injection locking widths of the master laser and the slave laser are illustrated in FIGS. 11 and 12. FIG. 11 illustrates whether or not the oscillation wavelength of the slave laser B during injection synchronization coincides with the oscillation wavelength of the master laser M when the oscillation wavelength of the slave laser B before the injection synchronization is swept from ~848.8 nm to ~849.1 nm with the oscillation wavelength of the master laser M being fixed to ~848.95 nm. When the oscillation wavelength of the slave laser B before the injection synchronization is in an injection locking width of ~848.85 nm to ~849.05 nm, the oscillation wavelength of the slave laser B during the injection synchronization coincides with the oscillation wavelength of the master laser M.

FIG. 12 illustrates that the injection locking width can be effectively widened by adjusting a parameter $\alpha$ represented in Numerical Expression 16, and the injection synchronization is easily achieved.

$$\alpha = \frac{d\langle\chi_r\rangle}{d\langle N_{CO}\rangle}\left(\frac{d\langle\chi_i\rangle}{d\langle N_{CO}\rangle}\right)^{-1}$$  [Numerical Expression 16]

Here, $\langle\chi_r\rangle$ is a real part of the electric susceptibility of a gain medium, $\langle\chi_i\rangle$ is an imaginary part of the electric susceptibility of the gain medium, and $\langle N_{CO}\rangle$ is the number of carriers in an active layer.

When the parameter $\alpha$ is zero, the injection locking width is as represented in Numerical Expression 17. On the other hand, when the parameter $\alpha$ is greater than zero, the injection locking width is as represented in Numerical Expression 18.

$$-\frac{F_0}{A_0}\sqrt{\frac{\omega}{Q}} \le \Delta\omega \le \frac{F_0}{A_0}\sqrt{\frac{\omega}{Q}}, \alpha = 0 \quad \text{[Numerical Expression 17]}$$

$$-\sqrt{1+\alpha^2}\frac{F_0}{A_0}\sqrt{\frac{\omega}{Q}} \le \Delta\omega \le \frac{F_0}{A_0}\sqrt{\frac{\omega}{Q}}, \alpha > 0 \quad \text{[Numerical Expression 18]}$$

$\Delta\omega_L$ illustrated in FIG. 12 is the same as $\Delta\omega_{max}$ represented in Numerical Expression 15. When $\alpha=0$, the injection locking width is $-1 \le \Delta\omega/\Delta\omega_L \le +1$, which is the same as that represented in Numerical Expression 15. On the other hand, when $\alpha=4$, the injection locking width is $-\sqrt{(1+4^2)} \le \Delta\omega/\Delta\omega_L \le +1$ and is effectively widened.

(Configuration and Principle of Inter-Slave Optical Path Length Control Unit)

Each inter-slave optical path length control unit IP performs control of the interference intensity of oscillated light of two slave lasers B to have an extreme value with respect to a change in the optical path length between the two slave lasers B, thereby performing feedback control of the optical path length between the two slave lasers B to be a half-integer multiple or integer multiple of the oscillation wavelength of the injection synchronization. Details thereof will be described as below. Here, the injection synchronization has been completed.

Figure 13:
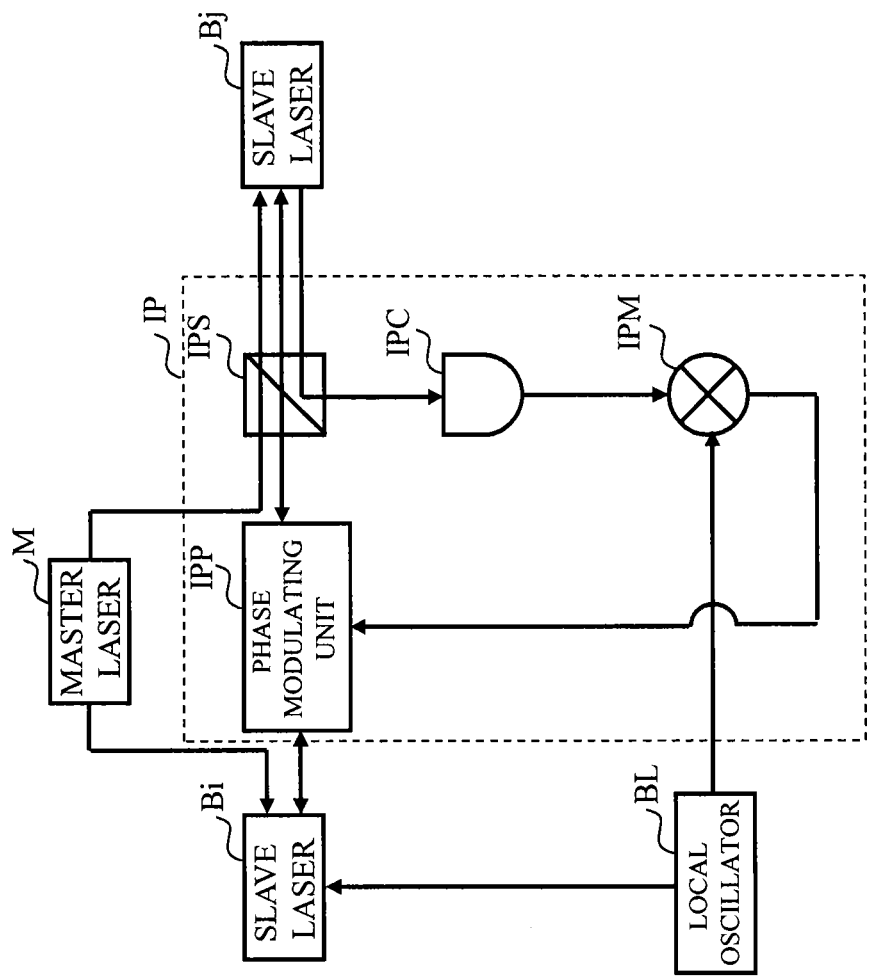
FIG. 13 is a diagram that illustrates the configuration of an inter-slave optical path length control unit.
Figure 14A:
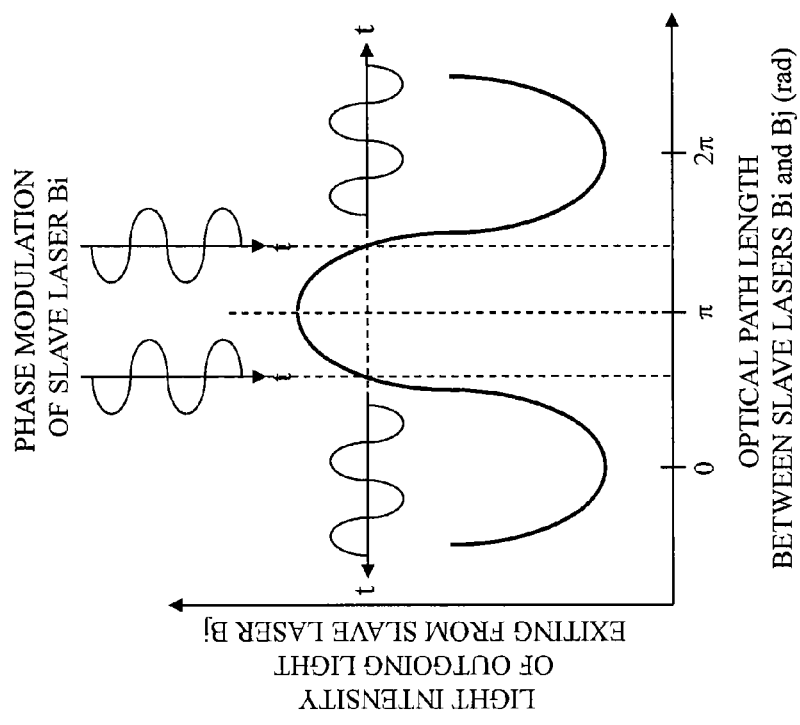
FIG. 14(a) is a diagram that illustrates the principle of controlling the length of an optical path between slaves.
Figure 14B:
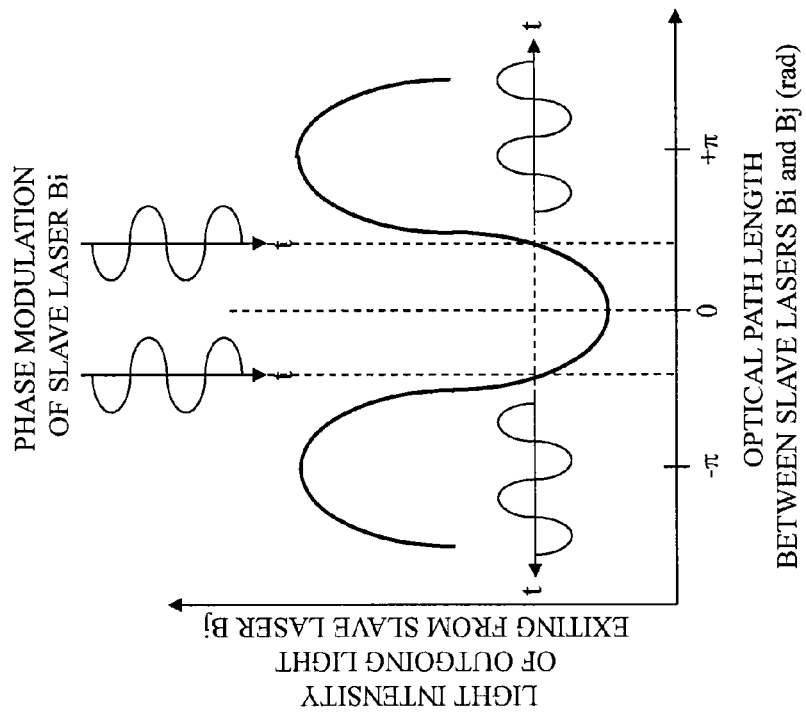
FIG. 14(b) is a diagram that illustrates the principle of controlling the length of an optical path between slaves.

The configuration of the inter-slave optical path length control unit is illustrated in FIG. 13. The principle of the inter-slave optical path length control unit is illustrated in FIGS. 14(a) and 14(b). The inter-slave optical path length control unit IP is configured by an optical splitter IPS, a photodiode IPC, a mixer circuit IPM, and a phase modulating unit IPP.

A local oscillator BL performs phase modulation of a carrier signal for a slave laser Bi. The phase modulating unit IPP is arranged in the inter-slave optical path unit IL and controls an optical path length between slave lasers Bi and Bj based on a result of the synchronous detection to be described later.

The optical splitter IPS is arranged in the inter-slave optical path unit IL and splits outgoing light, which exits from the slave laser Bj, from incident light that is incident to the slave laser B. Here, the outgoing light exiting from the slave laser Bj receives a phase change of π. The photodiode IPC performs photoelectric conversion of the output of the optical splitter IPS. The mixer circuit IPM performs synchronous detection illustrated in FIGS. 14(a) and 14(b) for the output of the photodiode IPC by using the output of the local oscillator BL.

FIG. 14(a) illustrates a case where $J_{ij} > 0$, and the optical path length between the slave lasers Bi and Bj is controlled so as to be a half-integer multiple (π rad) of the oscillation wavelength of the injection synchronization. When the optical path length between the slave lasers Bi and Bj is π rad, the interference intensity of the oscillated light of the slave lasers Bi and Bj takes a maximum in consideration of a phase change of π in the optical splitter IPS.

When the optical path length is less than π rad, as the optical path length increases, the output of the photodiode IPC increases. Accordingly, the output of the photodiode IPC has the same frequency and the same phase as those of the output of the local oscillator BL, whereby a result of the synchronous detection is positive.

On the other hand, when the optical path length is more than π rad, as the optical path length increases, the output of the photodiode IPC decreases. Accordingly, the output of the photodiode IPC has the same frequency and the opposite phase compared to the output of the local oscillator BL, whereby a result of the synchronous detection is negative.

In addition, when the optical path length is π rad, the output of the photodiode IPC is a maximum with respect to a change in the optical path length. Accordingly, the output of the photodiode IPC has a frequency that is twice the frequency of the output of the local oscillator BL, whereby a result of the synchronous detection is zero.

The phase modulating unit IPP performs control of the optical path length between the slave lasers Bi and Bj such that a result of the synchronous detection changes from a positive value to a negative value through zero as the optical path length increases.

FIG. 14(b) illustrates a case where $J_{ij} < 0$, and the optical path length between the slave lasers Bi and Bj is controlled so as to be an integer multiple (0 rad) of the oscillation wavelength of the injection synchronization. When the optical path length between the slave lasers Bi and Bj is 0 rad, the interference intensity of the oscillated light of the slave lasers Bi and Bj takes a minimum in consideration of a phase change of π in the optical splitter IPS.

When the optical path length is less than 0 rad, as the optical path length increases, the output of the photodiode IPC decreases. Accordingly, the output of the photodiode IPC has the same frequency and the opposite phase compared to the output of the local oscillator BL, whereby a result of the synchronous detection is negative.

When the optical path length is more than 0 rad, as the optical path length increases, the output of the photodiode IPC increases. Accordingly, the output of the photodiode IPC has the same frequency and the same phase as those of the output of the local oscillator BL, whereby a result of the synchronous detection is positive.

In addition, when the optical path length is 0 rad, the output of the photodiode IPC is a minimum with respect to a change in the optical path length. Accordingly, the output of the photodiode IPC has a frequency that is twice the frequency of the output of the local oscillator BL, whereby a result of the synchronous detection is zero.

The phase modulating unit IPP performs control of the optical path length between the slave lasers Bi and Bj such that a result of the synchronous detection changes from a negative value to a positive value through zero as the optical path length increases.

In addition, the phase modulation of the slave laser B is performed based on current modulation control. The current modulation control (~10 MHz) causes phase modulation but does not cause a frequency shift. Accordingly, upon performing phase modulation of the slave laser B, there is no influence on the precision of the injection synchronization.

(Sequence of Each Step in Ising Model Computing Process)

As above, the oscillation phase measuring unit PM measures an ising spin. In performing this process, the oscillation frequency control unit FC synchronizes the whole quantum computer, and the inter-slave optical path length control unit IP implements ising interaction.

Here, the oscillation frequency control unit FC adjusts the oscillation frequency of the slave laser B, and the inter-slave optical path length control unit IP adjusts the optical path length between slave lasers B. However, the oscillation phase measuring unit PM measures the ising spin in a state in which the oscillation frequency of the slave laser B and the optical path length between the slave lasers B are fixed. Accordingly, an oscillation frequency control step and an inter-slave optical path length control step cannot be performed simultaneously with an oscillation phase measuring step. The sequence of each step will be described as below.

Figure 15:
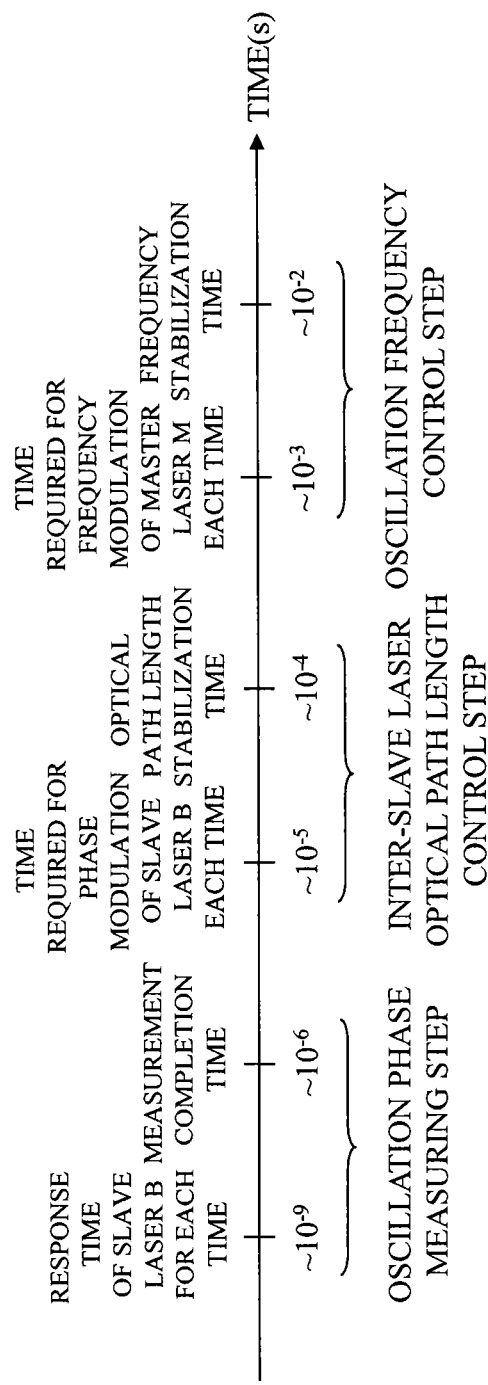
FIG. 15 is a diagram that illustrates time scales of steps in an ising model computation process.
Figure 25:
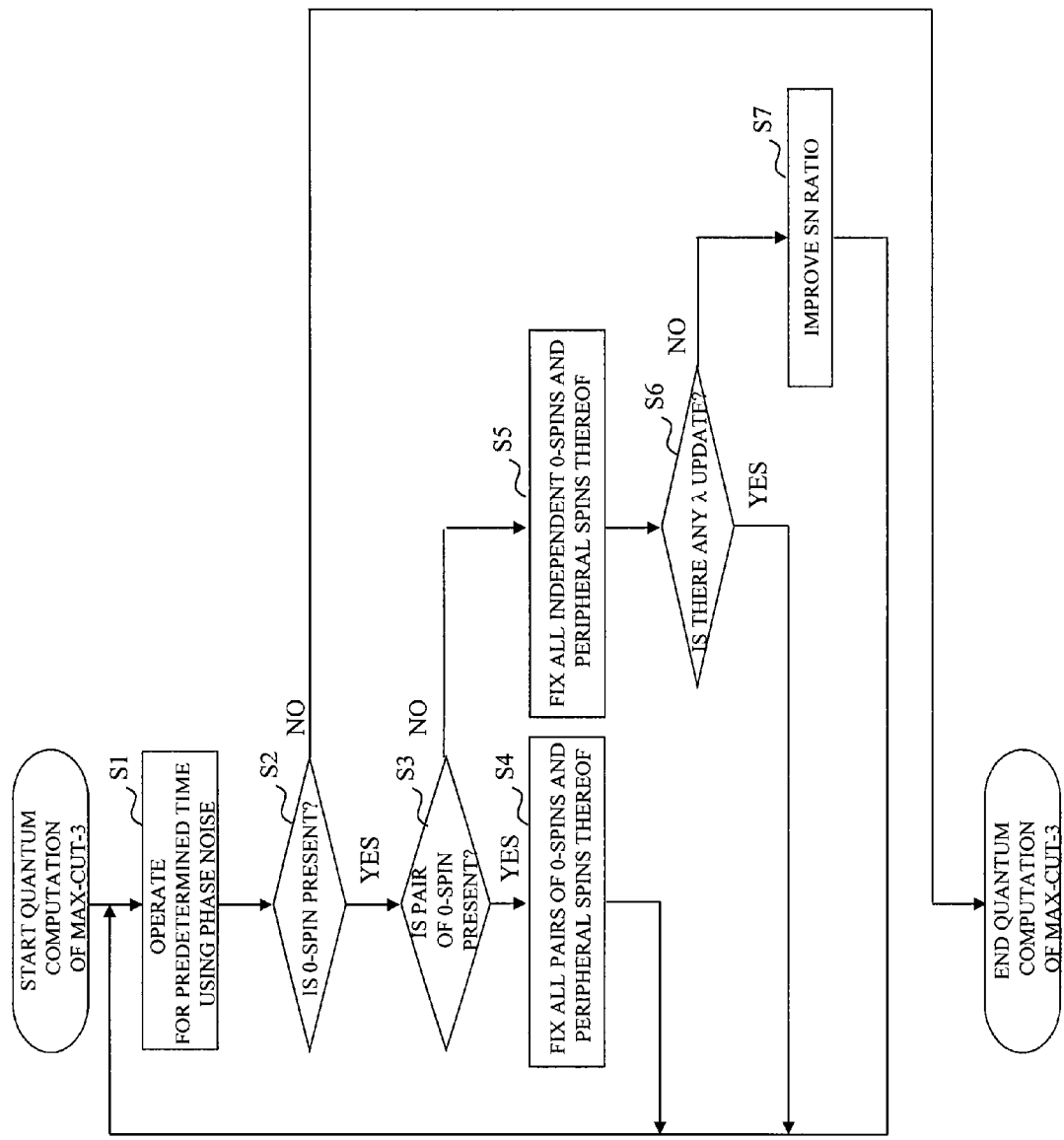
FIG. 25 is a flowchart that illustrates self-learning for resolving the frustration of a spin.

FIG. 15 illustrates the time scale of each step in the ising model computation process. In the oscillation phase measuring step, when the simulation result illustrated in FIG. 5 is considered, a response time of the slave laser B per each time and a time required for self-learning per each time to be described later with reference to FIG. 25 are ~$10^{-9}$ s, and a measurement completion time is ~$10^{-6}$ s.

In the inter-slave laser optical path length control step, in consideration of characteristics of the device, a time required for phase modulation of the slave laser B per each time is ~$10^{-5}$ s, and a time during which the optical path length is maintained to be stabilized is ~$10^4$ s. In the oscillation frequency control step, in consideration of the characteristics of the device, a time required for frequency modulation of the master laser M per each time is ~$10^{-3}$ s, and a time during which the frequency is stabilized is ~$10^{-2}$ s.

As above, in the oscillation phase measuring step, the inter-slave laser optical path length control step, and the oscillation frequency control step, the time scales are separated. In other words, when the oscillation phase measuring step is performed after the oscillation frequency control step and the inter-slave laser optical path length control step, there is no change in the oscillation frequency and the inter-slave laser optical path length during the measurement of the oscillation phase. Accordingly, for the whole quantum computer using the ising model, one oscillation mode is assured to be integrally started, the ising interaction can be correctly implemented, and the ising model can be correctly computed.

Figure 16:
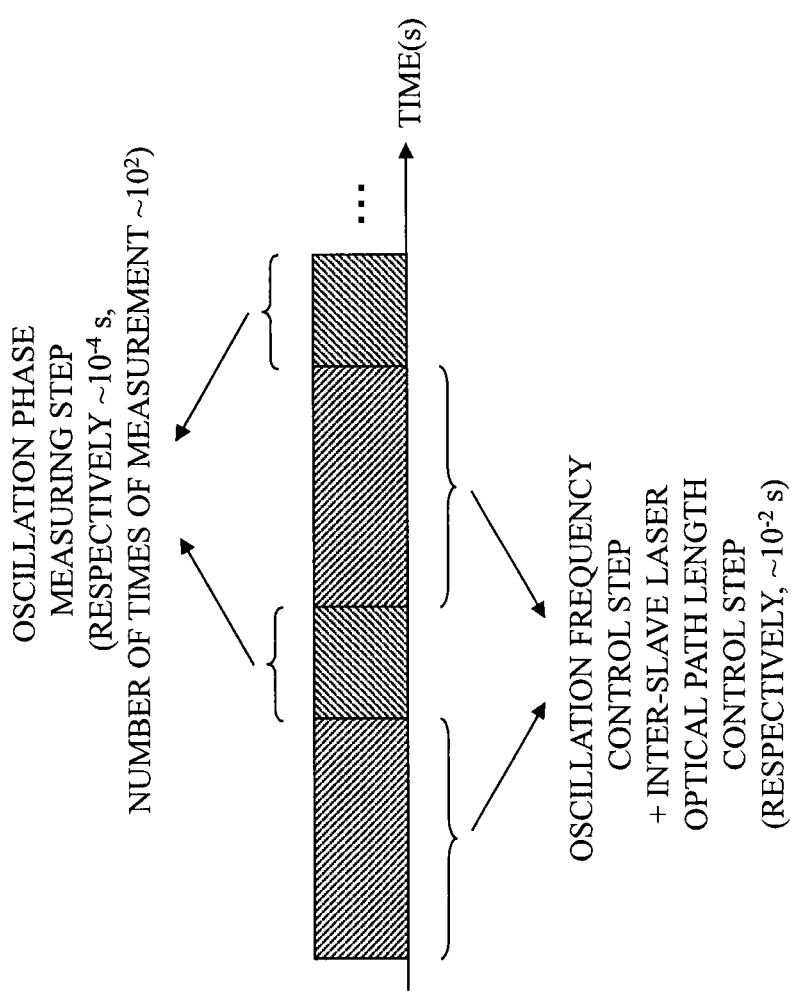
FIG. 16 is a diagram that illustrates a time table of each step in an ising model computation process.

FIG. 16 illustrates a time table of each step of the ising model computation process. First, the oscillation frequency control step and the inter-slave laser optical path length control step are performed over ~$10^{-2}$ s. Next, the oscillation phase measuring step is performed for the number ~$10^2$ of times of measurement over ~$10^{-2}$ s. As above, the steps can be alternately performed.

(Content of Processing of Pumping Current Control Unit)

Figure 17:
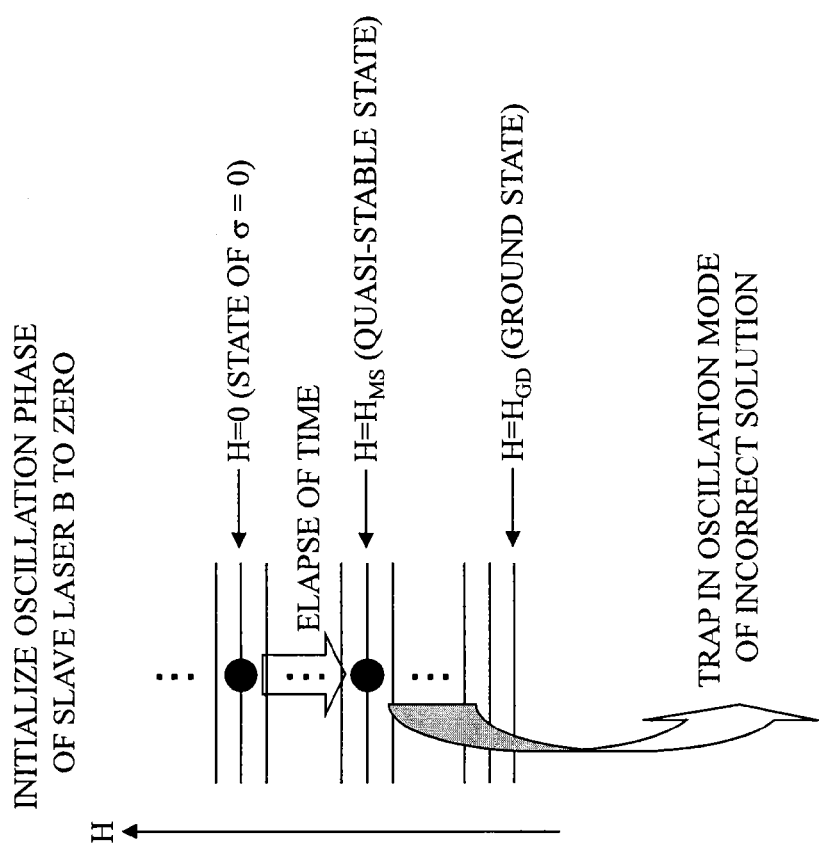
FIG. 17 is a diagram that illustrates the elapse of time in an ising model computation process.

For a case where the oscillation phase of the slave laser B is initialized to zero, the elapse of time in the ising model computation process is illustrated in FIG. 17. In the initialization state, the oscillation phase of each slave laser B is zero, the ising spin corresponding to each slave laser B is zero, and the Ising Hamiltonian is H=0. In accordance with the elapse of time, the oscillation phase of each slave laser B becomes ~$\pm\pi/2$, the ising spin corresponding to each slave laser B becomes ~$\pm 1$, and the Ising Hamiltonian becomes negative. However, there is concern that the state is trapped into a quasi-stable state H=$H_{MS}$ without being settled to the ground state H=$H_{GD}$.

Thus, the pumping current control unit PC is applied. The pumping current control unit PC, for two slave lasers B performing pseudo ising interaction through each inter-slave optical path unit IL, performs gradual increase control of pumping currents of the two slave lasers B in a state in which the magnitude and the sign of the pseudo ising interaction between the two slave lasers B are implemented to have fixed values and performs fixing control of the pumping currents of the two slave lasers B at a time point when all the slave lasers B arrive at one integrally oscillation mode "for the first time".

After all the slave lasers B arrive at one integrally oscillation mode "for the first time" so as to arrive at the steady state, the oscillation phase measuring unit PM measures relative values of the oscillation phases of all the slave lasers B with respect to the oscillation phase of the master laser M, thereby measuring pseudo ising spins of all the slave lasers B. The oscillation mode that has arrived at "for the first time" corresponds to the ground state.

Figure 18:
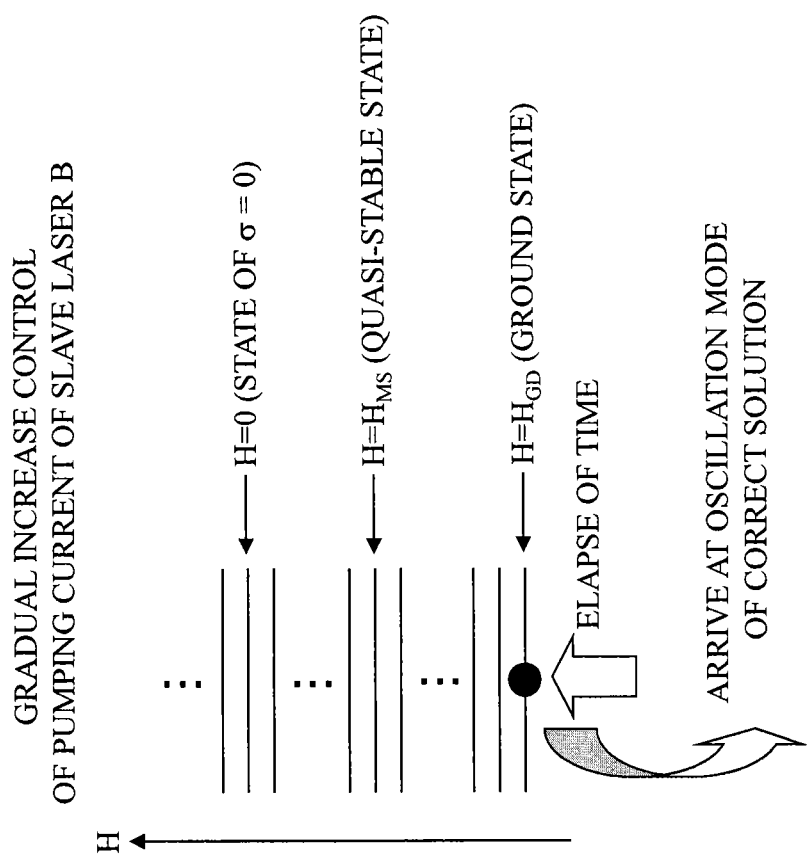
FIG. 18 is a diagram that illustrates the elapse of time in an ising model computation process.

For a case where gradual increase control of the pumping current of the slave laser B is performed, the elapse of time in the ising model computation process is illustrated in FIG. 18. When an oscillation mode, in which the threshold gain $\Sigma E_{C Vi}$ is minimal, is to be selected, $E_{C Vi}$ is in proportion to $N_{Ci}$ based on Numerical Expression 8, and accordingly, it is natural that an oscillation mode in which the inverted population number difference $\Sigma N_{Ci}$ of carriers is minimal is selected.

Before pumping, the inverted population of carriers is not implemented, and any oscillation mode is not implemented. In the pumping step, the inverted population of carriers is implemented, and, in accordance with a gradual increase in the pumping current, an oscillation mode in which the inverted population number difference $\Sigma N_{Ci}$ of carriers is minimal is selected, in other words, an oscillation mode in which the threshold gain $\Sigma E_{C Vi}$ is minimal is selected, and finally, the state is settled into the ground state.

As above, by using the pumping current control unit PC, the ground state of the ising model can be correctly arrived at without the state incorrectly being trapped into a quasi-stable state of the ising model.

(Method of Resolving Frustration of Spin)

While the quantum computer has been applied to the ising model including the ising interaction and the Zeeman energy as above, in this section, the quantum computer is applied to a problem of MAX-CUT-3. Here, the problem of MAX-CUT-3 will be described. In a graph configured by V nodes and E edges, each node has three adjacent nodes, and the edges have the same weighting or the same length. When V nodes are divided into two, the number of divided edges is configured to be minimal. The problem of MAX-CUT-3 is proved to be the NP-complete problem and is mapped into an ising model as represented in Numerical Expression 19.

$$H = \sum_{i<j} J_{ij} \sigma_i \sigma_j, \quad \text{[Numerical Expression 19]}$$

$$J_{ij} = \begin{cases} +1 \begin{pmatrix} \text{when the nodes } i \text{ and} \\ j \text{ are adjacent to each other} \end{pmatrix} \\ 0 \begin{pmatrix} \text{when the nodes } i \text{ and} \\ j \text{ are not adjacent} \\ \text{to each other} \end{pmatrix} \end{cases}$$

Here, a problem of MAX-CUT-3 in which four sites form a graph of a regular tetrahedron will be considered. When $J_{ij}$=+1 at adjacent sites, in order to minimize the Hamiltonian, it is preferable that the directions of spins at adjacent sites be opposite to each other. However, even though the direction of the spin can be opposite at a certain adjacent site, the problem of the spin frustration, that the direction of the spin is inevitably the same direction at another adjacent site occurs.

In a case where the problem of spin frustration occurs, a state is implemented in which a plurality of ground states are superimposed. Here, in order to statistically measure many photons, the oscillation phase measuring unit PM does not measure one ground state out of the plurality of ground states but measures an average state of the plurality of ground states. Therefore, "0 spin" occurs.

However, since any of the plurality of ground states leads a correct result, any one of the plurality of ground states may be selected. Thus, by fixing the direction of the spin at a specific site, candidates for the direction of the spin at another site may be narrowed. Here, in order to fix the direction of the spin at a specific site, Zeeman energy may be applied at the specific site by injecting light having vertically linear polarization

|V>, for which phase modulation has been performed, from the master laser M to the slave laser B corresponding to the specific site through the master-to-slave intensity control unit ZA and the master-to-slave phase control unit ZP corresponding to the specific site.

Figure 19A:
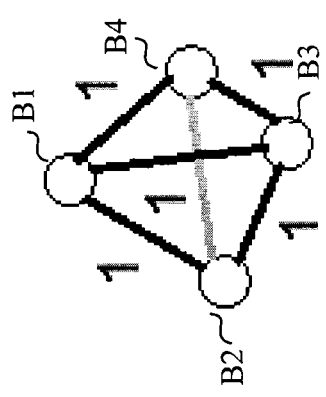
FIG. 19(a) is a diagram that illustrates the frustration of a spin.
Figure 19B:
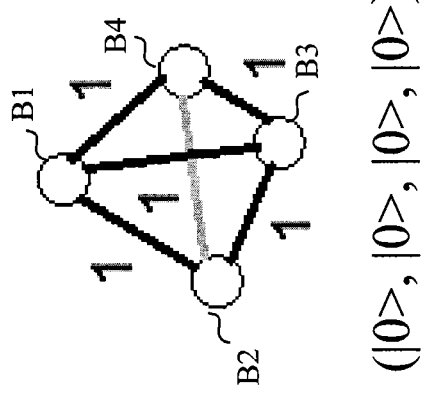
FIG. 19(b) is a diagram that illustrates the frustration of a spin.

The spin frustration is illustrated in FIGS. 19(a) and 19(b). In a case where the direction of the spin at each site is not fixed, the directions of pseudo spins of the slave lasers B1 to B4 are not determined.

Figure 20A:
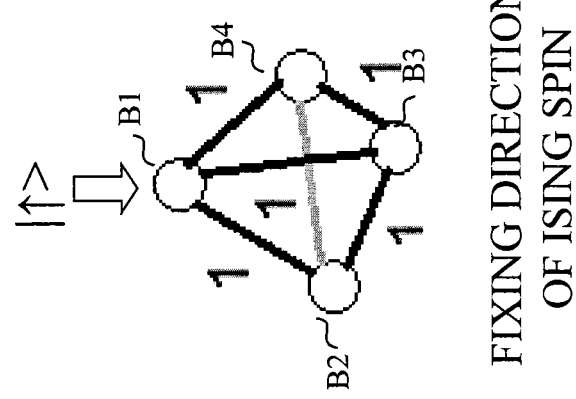
FIG. 20(a) is a diagram that illustrates a case where the frustration of a spin is incorrectly resolved.
Figure 20B:
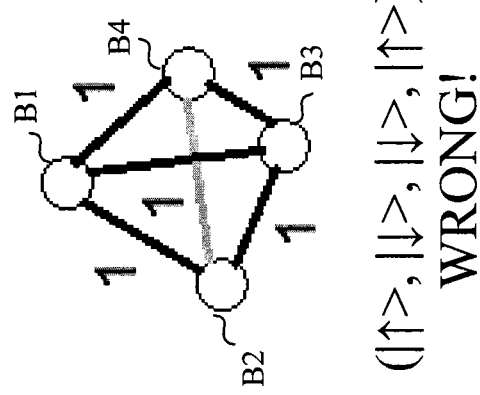
FIG. 20(b) is a diagram that illustrates a case where the frustration of a spin is incorrectly resolved.

A case where the spin frustration is incorrectly resolved is illustrated in FIGS. 20(a) and 20(b). In the case, the direction of the spin at the first site is fixed. More specifically, pseudo Zeeman energy is applied such that the direction of the pseudo spin of the slave laser B1 is fixed to +1.

Then, the direction of the pseudo spin of the slave laser B1 is determined to be +1, and the directions of pseudo spins of the slave lasers B2 to B4 are determined to be −1. However, $(\sigma_1, \sigma_2, \sigma_3, \sigma_4) = (+1, -1, -1, -1)$ is an incorrect result, and a correct result is any one of $(\sigma_1, \sigma_2, \sigma_3, \sigma_4) = (+1, +1, -1, -1)$, $(+1, -1, +1, -1)$, and $(+1, -1, -1, +1)$. The reason for the acquisition of the incorrect result is that the oscillation phase measuring unit PM measures an average state of the above-described three ground states so as to measure many photons in a statistical manner.

Figure 21A:
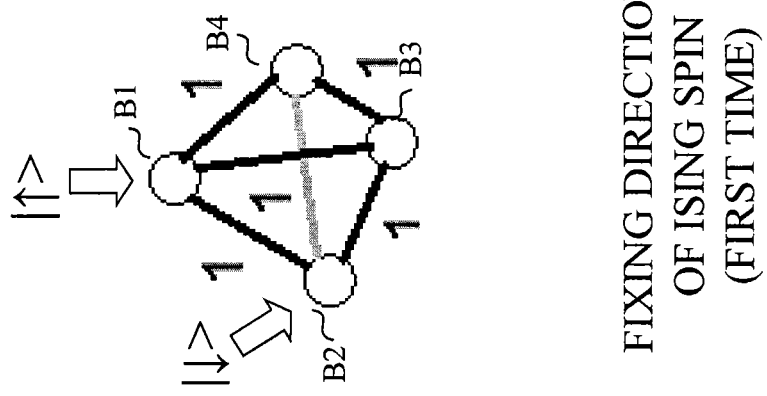
FIG. 21(a) is a diagram that illustrates a case where the frustration of a spin is correctly resolved.
Figure 21C:
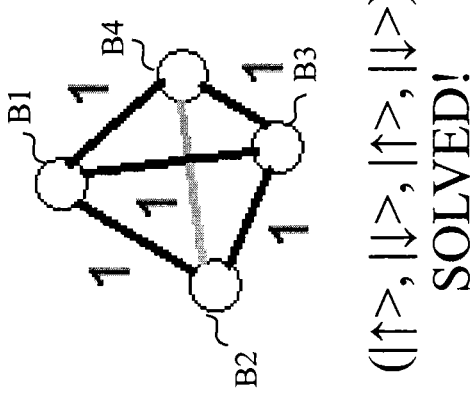
FIG. 21(c) is a diagram that illustrates a case where the frustration of a spin is correctly resolved.

A case where the spin frustration is correctly resolved is illustrated in FIGS. 21(a), 21(b) and 21(c). In the case, the directions of spins at the first and second sites are fixed as illustrated in FIG. 21(a), and the directions of spins at the third and fourth sites are fixed as illustrated in FIG. 21(b).

As illustrated in FIG. 21(a), pseudo Zeeman energy is applied such that the directions of pseudo spins of the slave lasers B1 and B2 are fixed to +1 and −1. Here, the reason for fixing the directions of spins at adjacent sites to opposite directions is that the ising interaction is $J_{ij}=+1$ and positive.

Then, the direction of the pseudo spin of the slave laser B1 is determined to be +1, and the direction of the pseudo spin of the slave laser B2 is determined to be −1. However, the directions of pseudo spins of the slave lasers B3 and B4 are not determined. The reason for the occurrence of "0 spin" is that the oscillation phase measuring unit PM measures an average state of two ground states $(\sigma_1, \sigma_2, \sigma_3, \sigma_4) = (+1, -1, +1, -1)$ and $(+1, -1, -1, +1)$ so as to measure many photons in a statistical manner.

As illustrated in FIG. 21(b), pseudo Zeeman energy is applied such that the directions of pseudo spins of the slave lasers B3 and B4 are fixed to +1 and −1. Here, the reason for fixing the directions of spins at adjacent sites to opposite directions is that the ising interaction is $J_{ij}=+1$ and positive.

Then, as illustrated in FIG. 21(c), the directions of pseudo spins of the slave lasers B1 and B3 are fixed to +1, and the directions of pseudo spins of the slave lasers B2 and B4 are fixed to −1. Thus, $(\sigma_1, \sigma_2, \sigma_3, \sigma_4) = (+1, -1, +1, -1)$ is a correct result. As illustrated in FIGS. 21(a), 21(b) and 21(c), for adjacent sites, by consecutively performing the fixing of the direction of spins to opposite directions twice, the problem of MAX-CUT-3 in which four sites form a graph of a regular tetrahedron can be correctly solved. Even when a general problem of MAX-CUT-3 is correctly solved, in a case where the problem of spin frustration occurs, the above-described process can be applied.

When the description presented above is taken together, the master-to-slave intensity control unit ZA and the master-to-slave phase control unit ZP correspond to an adjacent ising spin direction fixing unit. Here, for two slave lasers B performing pseudo ising interaction through the inter-slave laser optical path unit ZL, there are cases where relative values of the oscillation phases of the two slave lasers B with respect to the oscillation phase of the master laser M are not measured to be meaningful.

Thus, the master-to-slave intensity control unit ZA and the master-to-slave phase control unit ZP control the intensity and the phase of light injected to each one of the two slave lasers B. Then, when the sign of the pseudo ising interaction between the two slave lasers B is implemented to be positive, the master-to-slave intensity control unit ZA and the master-to-slave phase control unit ZP fix the directions of the pseudo spins of the two slave lasers B to be different from each other. Alternatively, when the sign of the pseudo ising interaction between the two slave lasers B is implemented to be negative, the master-to-slave intensity control unit ZA and the master-to-slave phase control unit ZP fix the directions of the pseudo spins of the two slave lasers B to be the same. Therefore, the frustration of the pseudo spin between the two slave lasers B performing pseudo ising interaction can be resolved.

Here, when the directions of spins are fixed in sites adjacent to each other, there are cases where in a site adjacent to the sites adjacent to each other, the direction of the spin, which has not been fixed yet, is flipped. Accordingly, the frustration of a pseudo spin cannot be resolved by only fixing the directions of spins at the sites adjacent to each other. However, by fixing the direction of the spin at the site adjacent to the sites adjacent to each other, the frustration of the pseudo spin can be resolved.

Figure 22A:
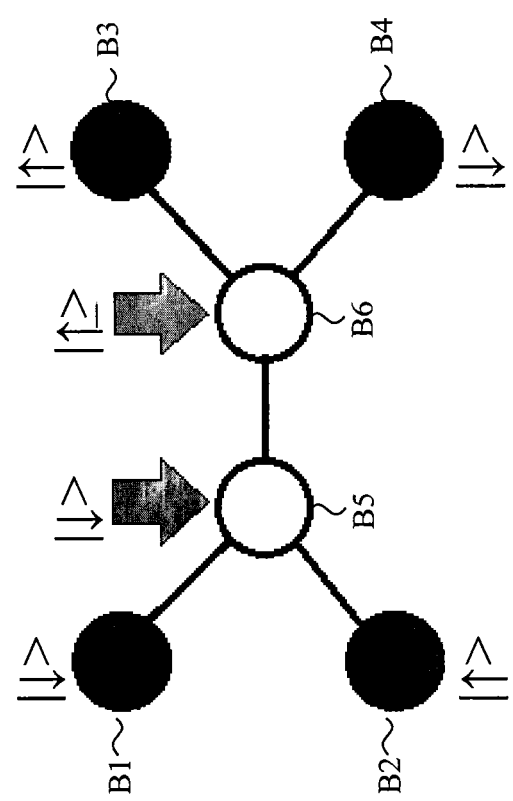
FIG. 22(a) is a diagram that illustrates a problem of flipping the directions of spins of peripheral sites which occurs when the directions of spins of adjacent sites are fixed.
Figure 22B:
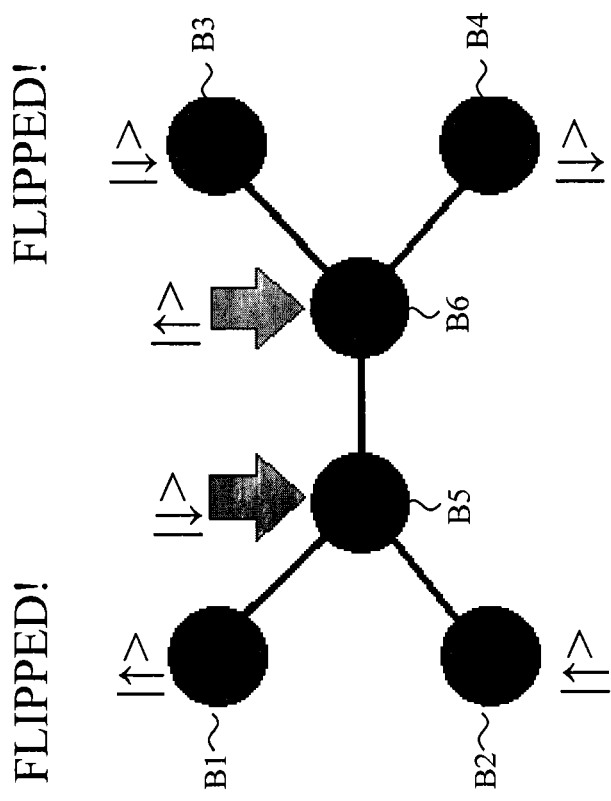
FIG. 22(b) is a diagram that illustrates a problem of flipping the directions of spins of peripheral sites which occurs when the directions of spins of adjacent sites are fixed.
Figure 23:
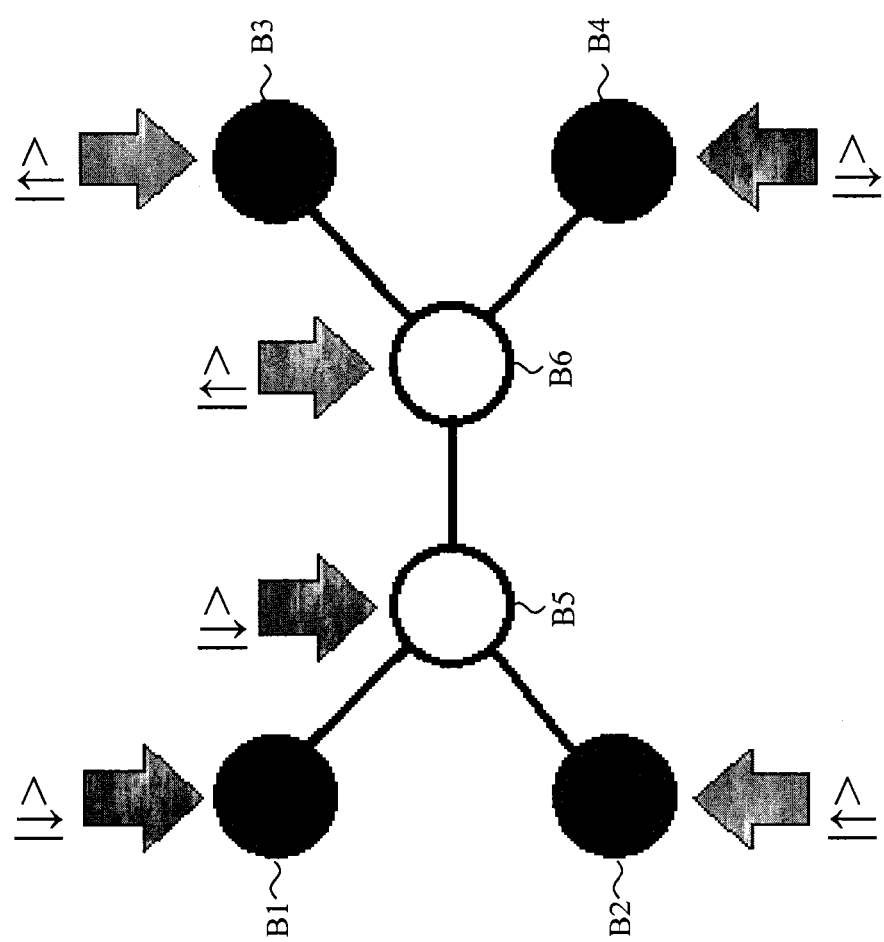
FIG. 23 is a diagram that illustrates a method for solving the problem of flipping the directions of spins of peripheral sites which occurs when the directions of spins of peripheral sites are fixed.

Here, a problem of MAX-CUT-3 formed by six sites will be considered. The problem of flipping the direction of the spin of a peripheral site, which occurs when the directions of the spins of the adjacent sites are fixed, is illustrated in FIGS. 22(a) and 22(b). A method for solving the problem of flipping the direction of the spin of a peripheral site, which occurs when the directions of the spins of the adjacent sites are fixed, is illustrated in FIG. 23. Here, sites corresponding to the slave lasers B5 and B6 are adjacent to each other, sites corresponding to slave lasers B1 and B2 are connected to a site corresponding to the slave laser B5, and sites corresponding to slave lasers B3 and B4 are connected to a site corresponding to a slave laser B6.

Before the directions of pseudo spins of the slave lasers B5 and B6 are fixed to −1 and +1, the directions of pseudo spins of the slave lasers B1, B2, B3, and B4 are provisionally determined to be −1, +1, +1, and −1.

Here, as illustrated in FIGS. 22(a) and 22(b), when the directions of pseudo spins of the slave lasers B1, B2, B3, and B4 are not fixed, the directions of pseudo spins of the slave lasers B1 and B3 are flipped to +1 and −1 after the directions of pseudo spins of the slave lasers B5 and B6 are fixed to −1 and +1.

However, as illustrated in FIG. 23, in a case where the directions of pseudo spins of the slave lasers B1, B2, B3, and B4 are fixed, after the directions of pseudo spins of the slave lasers B5 and B6 are fixed to −1 and +1, the directions of pseudo spins of the slave lasers B1, B2, B3, and B4 are not flipped.

When the description presented above is taken together, the master-to-slave intensity control unit ZA and the master-to-slave phase control unit ZP correspond to a peripheral ising spin direction fixing unit. Here, for two slave lasers B performing pseudo ising interaction through the inter-slave laser optical path unit ZL, there are cases where relative values of the oscillation phases of the two slave lasers B with respect to the oscillation phase of the master laser M are not measured to be meaningful.

Thus, the master-to-slave intensity control unit ZA and the master-to-slave phase control unit ZP control the intensity and the phase of light injected to each one of the adjacent slave lasers B performing pseudo ising interaction with the two slave lasers B through another inter-slave laser optical path unit ZL. Then, the master-to-slave intensity control unit ZA and the master-to-slave phase control unit ZP fix the directions of the pseudo spins of the adjacent slave lasers B to the directions of the current time point during the computation process. Accordingly, when the frustration of the pseudo spin between two slave lasers B performing pseudo ising interaction is resolved, it can be prevented that pseudo spins are unintentionally flipped in the slave lasers B that are pseudo-adjacent to the two slave lasers B.

Figure 24:
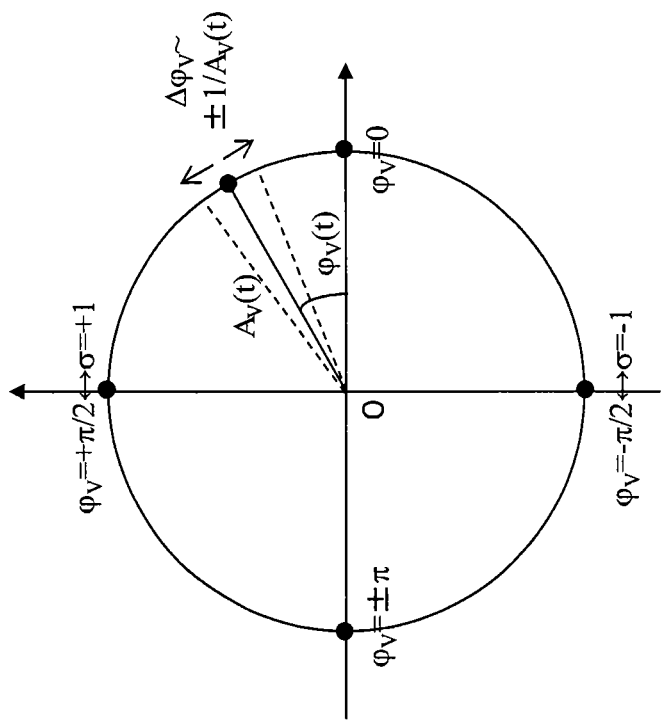
FIG. 24 is a diagram that illustrates a noise with respect to the oscillation phase of a slave laser.

A noise with respect to the oscillation phase of the slave laser is illustrated in FIG. 24. The flowchart of self-learning for resolving spin frustration is illustrated in FIG. 25.

Here, in the slave laser B, since the oscillation phase $\phi_{Vi}$ is associated with a spin $\sigma_i$, the influence of a noise $F\phi_V$ on the oscillation phase $\phi_{Vi}$ is received much, but the influence of a noise $F_N$ on the oscillation intensity $A_{Vi}$ and the inverted population number difference $N_{Ci}$ of carriers is hardly received. Thus, the noise $F\phi_N$ on the oscillation phase $\phi_{Vi}$ will be described.

FIG. 24 illustrates a noise $\Delta\phi_V$ with respect to an oscillation phase $\phi_V(t)$. The phase noise $F\phi_V$ is caused by spontaneous emission. One photon caused by spontaneous emission is generated for every $2/E_{CVi}$ 18 2 psec, and each photon generates a phase noise of $\Delta\phi_Vi \sim \pm 1/A_{Vi}(t)$ with the same probability, whereby the quantum computer can be prevented from falling into a local minimum.

First, the quantum computer is operated for a predetermined time using the phase noise $F\phi_V$ (Step S1). Here, the predetermined time is a time during which the direction of a pseudo spin can be determined when the frustration of the pseudo spin is dissolved.

When there is no "0 spin" (No in Step S2), the frustration of the pseudo spin is dissolved, and the quantum computing ends. On the other hand, when there is "0 spin" (Yes in Step S2), the frustration of the pseudo spin is not dissolved, the quantum computing is continued, and the direction of the pseudo spin of "0 spin" is fixed.

When there is a "0 spin pair" (Yes in Step S3), as described with reference to FIGS. 21(*a*), 21(*b*), 21(*c*) and 23, all the "0 spin pairs" and spins on the periphery thereof are fixed (Step S4). Then, the process is returned to Step S1.

On the other hand, when there is no "0 spin pair" (No in Step S3), all the "isolated 0 spins" and spins on the periphery thereof are fixed (Step S5).

Regardless of fixing all the "isolated 0 spins" and the spins on the periphery thereof (Step S5), there are cases where $\lambda_i$ is not updated. It is assumed that the reason for this is not that there is an incorrect solution but that a difference in the photon numbers of light having oscillation phases $\phi Vi \sim \pm \pi/2$ is small, whereby the signal-to-noise ratio S/N is low.

When there is an update of $\lambda_i$ (Yes in Step S6), the process is returned to Step S1. On the other hand, when there is no update of $\lambda_i$ (No in Step S6), by increasing the magnitude of $\lambda_i$, the signal-to-noise ratio S/N is improved by increasing a difference in the photon numbers of light having oscillation phases $\phi_{vi} \sim \pm \pi/2$ (Step S7), and the process is returned to Step S1.

(Stability of Quantum Computer)

A delay time of pseudo ising interaction between two slave lasers B performing pseudo ising interaction may have influence on the stability of the quantum computer.

The simulation of the temporal development as illustrated in FIGS. 6(*a*), 6(*b*), 6(*c*) and 6(*d*) was performed for various delay times $t_d$ of the pseudo ising interaction between adjacent sites. When $t_d < 6 \times 10^{-10}$ seconds, at $\sim 10^{-9}$ sec, the state arrives at the steady state. When $t_d > 6 \times 10^{-10}$ seconds, the state does not arrive at the steady state and arrives at a chaos state.

Thus, in order to stably operate the quantum computer, it is necessary that $td < 6 \times 10^{-10}$ seconds. In other words, it is necessary to set the optical path length between two slave lasers B performing pseudo ising interaction to be shorter than $3 \times 10^8$ m/s $\times 6 \times 10^{-10}$ s $\sim 10$ cm. In addition, it is necessary that the delay time of the pseudo ising interaction between two slave lasers B performing pseudo ising interaction is shorter than the reciprocal ($\sim 1/30$ GHz) of the injection locking width of the master laser M and the two slave lasers B.

(Method for Mounting Ising Model Computer)

Figure 26:
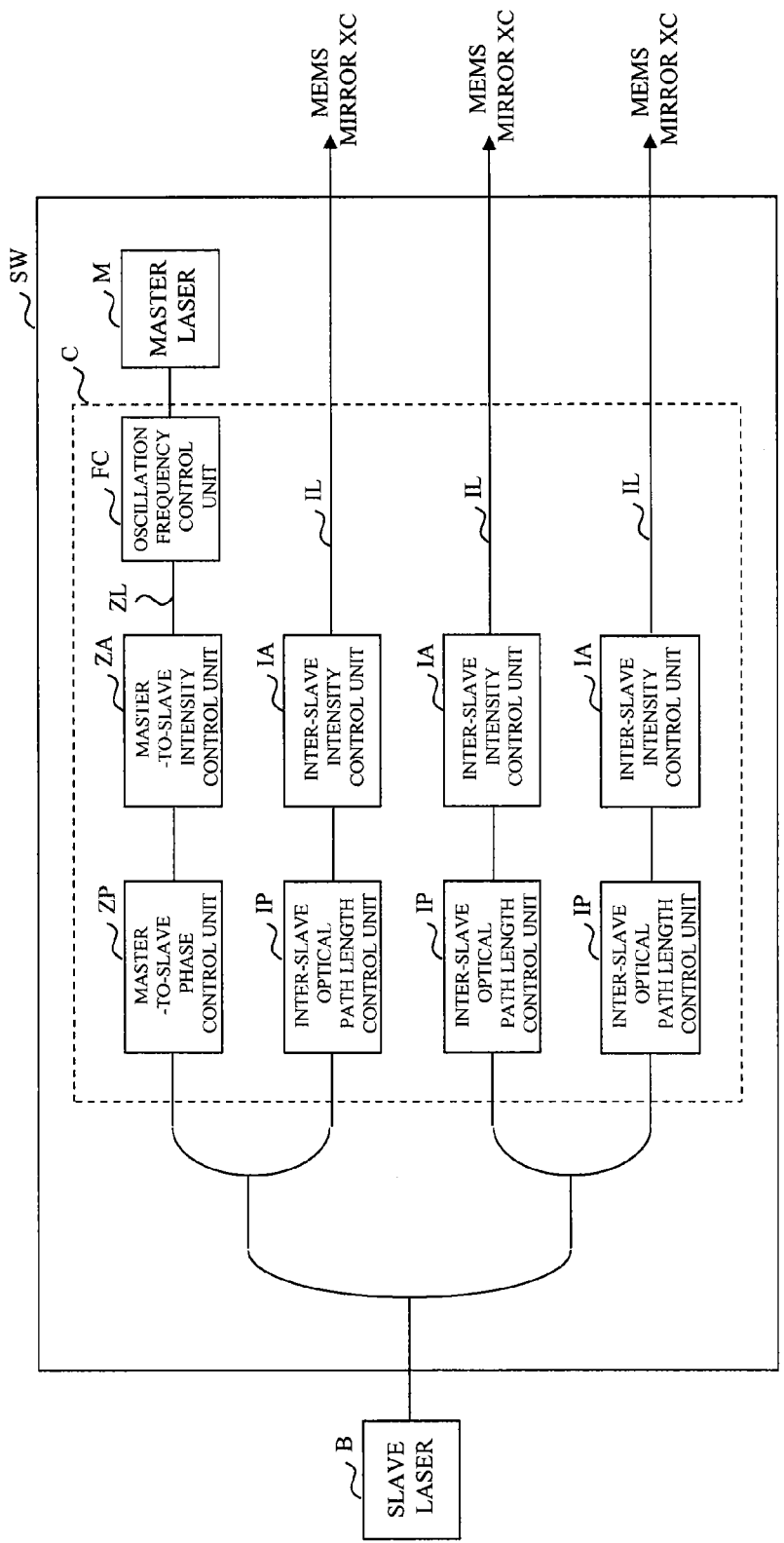
FIG. 26 is a diagram that illustrates a method for mounting an ising model computer.
Figure 27:
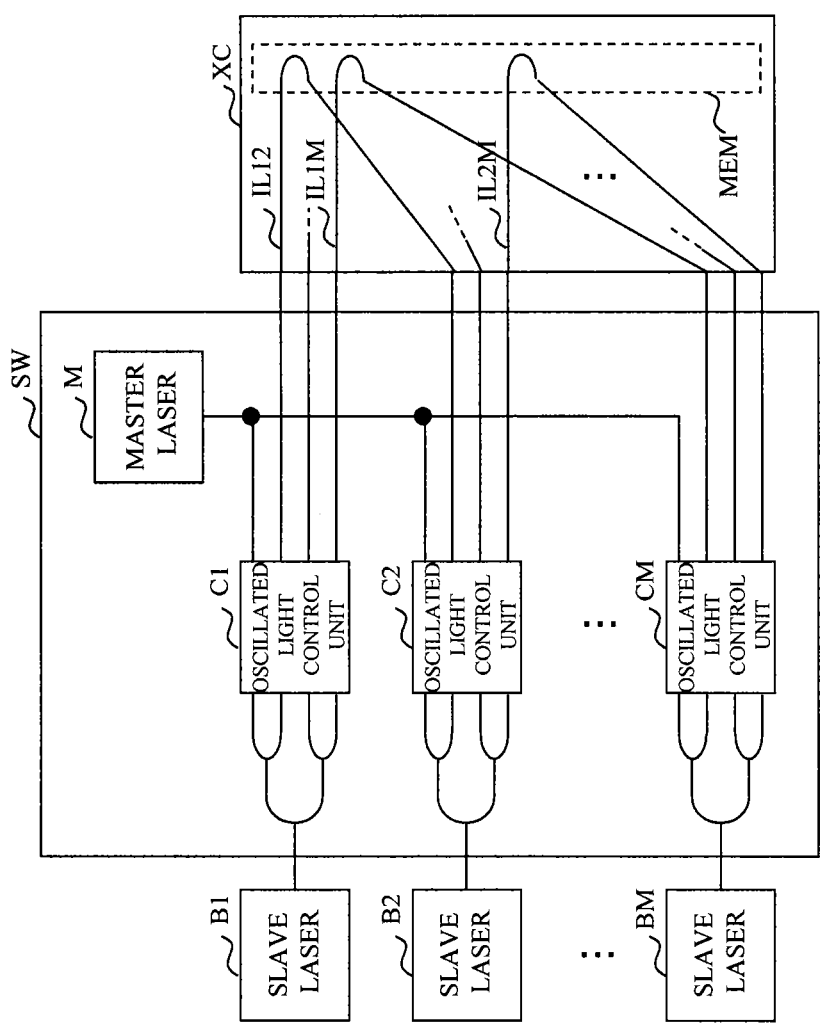
FIG. 27 is a diagram that illustrates a method for mounting an ising model computer.

Methods for mounting an ising model computer are illustrated in FIGS. 26 and 27. FIG. 26 illustrates a relation portion of each slave laser B. FIG. 27 illustrates relation portions of all the slave lasers B. Here, the problem of MAX-CUT-3 will be considered to be solved.

The ising model computer is configured by slave lasers B1, B2, . . . , BM, a silicon waveguide SW, and a micro electro mechanical system (MEMS) mirror XC. The silicon waveguide SW is connected to the MEMS mirror XC and has oscillated light control units C1, C2, . . . , CM and a master laser M built therein. The MEMS mirror XC is connected to the silicon waveguide SW and has inter-slave optical path units IL12, IL1M, IL2M, and the like and a mirror array MEM built therein.

The oscillated light control units C1, C2, . . . , CM are applied to the slave lasers B1, B2, . . . , BM. The master laser M is applied in common to the slave lasers B1, B2, . . . , BM.

The inter-slave optical path units IL12, IL1M, and IL2M are arranged between the slave lasers B1 and B2, the slave lasers B1 and BM, and the slave lasers B2 and BM. The mirror array MEM has light being incident thereto from the output end of a certain slave laser B and reflects light to the input end of another slave laser B.

In addition, the oscillated light control unit C has the master-to-slave phase control unit ZP, the master-to-slave intensity control unit ZA, the oscillation frequency control unit FC, and the master-to-slave optical path unit ZL built therein as portions implementing Zeeman energy. In addition, the oscillated light control unit C has the inter-slave optical path length control unit IP, the inter-slave intensity control unit IA, and the inter-slave optical path unit IL built therein as portions implementing ising interaction. Here, the problem of MAX-CUT-3 is considered to be solved, and only three systems of the portions implementing the ising interaction are mounted.

As above, by applying the silicon waveguide SW, amplitude modulation and phase modulation can be performed at high speed. In addition, by applying the MEMS mirror XC, patterns of two-body interaction different for each ising model can be mounted.

Modified Example

In the description presented above, while the slave laser B is applied as a system having a pseudo spin, in the present modified example, an exciton polariton included in a semiconductor micro cavity or the like may be applied. A ground state in which the kinetic energy of all the exciton polaritons of the whole system is minimum is realized, and, by measuring the oscillation phase generated by each exciton polariton, the pseudo spin of each exciton polariton is measured. In order to improve the computation accuracy, for the energy of all the exciton polaritons of the whole system, an energy difference between the ground state and the first excited state needs to be sufficiently larger than $k_B T$ (here, T is the temperature of the whole system).

As a Bose-Einstein condensate, even when other than the exciton polariton, for example, a Bose-Einstein condensate of a photon may be applied, pseudo ising interaction between sites may be implemented through exchange of photons between sites, and pseudo Zeeman energy may be implemented by injecting photons into each site from the master laser M.

INDUSTRIAL APPLICABILITY

The quantum computer and the quantum computing using the ising model of the present disclosure are appropriate for solving an NP-complete problem or the like mapped into an ising model easily and fast. For example, in a case where an ising model having the number of sites M=140 is to be solved, in a general computer or a quantum computer, while the computation time is $10^{42}$ times longer than that of a case where M=2, according to the quantum computer and the quantum computing using an ising model of the present disclosure, the computation time is only $10^4$ times longer than that of a case where M=2 in the worst case. In other words, the computation time is shortened by 38 digits.

REFERENCE SIGNS LIST

B1, B2, B3: Bose-Einstein condensing unit
D1, D2, D3: spin measuring unit
F: feedback control circuit
I1, I2, I3: ising interaction implementing unit
B, B1, B2, B3, B4, B5, B6, Bi, Bj, BM: slave laser
M: mater laser
ZL, ZL1, ZL2, ZL3: master-to-slave optical path unit
IL, IL12, IL23, IL13, IL1M, IL2M: inter-slave optical path unit
FC, FC1, FC2, FC3: oscillation frequency control unit
IA, IA12, IA23, IA13: inter-slave intensity control unit
IP, IP12, IP23, IP13: inter-slave optical path length control unit
ZA, ZA1, ZA2, ZA3: master-to-slave intensity control unit
ZP, ZP1, ZP2, ZP3: master-to-slave phase control unit
PM: oscillation phase measuring unit
PC: pumping current control unit
BR: light reflecting mirror
BG: amplified medium
BC: laser control unit
BL: local oscillator
ML: local oscillator
FCS: optical splitter
FCC: photodiode
FCM: mixer circuit
IPS: optical splitter
IPC: photodiode
IPM: mixer circuit
IPP: phase modulating unit
SW: silicon waveguide
C, C1, C2, CM: oscillated light control unit
XC: MEMS mirror
MEM: mirror array

What is claimed is:

1. A quantum computer using an ising model comprising:
a plurality of coherent oscillators that oscillate light having polarization polarized in a same direction determined in advance in correspondence with a plurality of sites of the ising model;
a master oscillator that performs injection synchronization for the plurality of coherent oscillators and oscillates the light having polarization polarized in the same direction determined in advance;
a master oscillator-to-coherent oscillator optical path unit that is arranged between the master oscillator and each one of the coherent oscillators;
an inter-coherent oscillator optical path unit that is arranged between two coherent oscillators for each pair of the plurality of the coherent oscillators;
an oscillation frequency control unit that is arranged in each master oscillator-to-coherent oscillator optical path unit and controls an oscillation frequency of each one of the coherent oscillators so as to be an oscillation frequency of the master oscillator;
an inter-coherent oscillator intensity control unit that is arranged in each inter-coherent oscillator optical path unit for each pair of the plurality of the coherent oscillators and implements a magnitude of pseudo ising interaction between two coherent oscillators by controlling an intensity of light exchanged between the two coherent oscillators;
an inter-coherent oscillator optical path length control unit that is arranged in each inter-coherent oscillator optical path unit for each pair of the plurality of the coherent oscillators and implements a sign of the pseudo ising interaction between two coherent oscillators by controlling an optical path length between the two coherent oscillators; and
an oscillation phase measuring unit that measures pseudo ising spins of the plurality of the coherent oscillators by measuring relative values of oscillation phases of the plurality of the coherent oscillators with respect to the oscillation phase of the master oscillator after the plurality of the coherent oscillators arrive at a steady state.

2. The quantum computer using an ising model according to claim 1, wherein each inter-coherent oscillator optical path length control unit implements the sign of pseudo ising interaction between two coherent oscillators by performing control such that an optical path length between the two coherent oscillators is a half-integer multiple or an integer multiple of an oscillation wavelength of the injection synchronization.

3. The quantum computer using an ising model according to claim 1, wherein the oscillation phase measuring unit determines that directions of pseudo ising spins of two coherent oscillators to be the same when oscillation phases of both the coherent oscillators lead before or lag behind the oscillation phase of the master oscillator for each pair of the plurality of the coherent oscillators and determines that the directions of the pseudo ising spins of two coherent oscillators to be different from each other when an oscillation phase of one coherent oscillator leads before the oscillation phase of the master oscillator and the oscillation phase of the other coherent oscillator lags behind the oscillation phase of the master oscillator for each pair of the plurality of the coherent oscillators.

4. The quantum computer using an ising model according to claim 1, further comprising:
a master oscillator-to-coherent oscillator intensity control unit that is arranged in each master oscillator-to-coherent oscillator optical path unit and implements the magnitude of pseudo Zeeman energy in each coherent oscillator by controlling the intensity of light injected into each coherent oscillator; and
a master oscillator-to-coherent oscillator phase control unit that is arranged in each master oscillator-to-coherent oscillator optical path unit and implements the sign of the pseudo Zeeman energy in each coherent oscillator by controlling the phase of light injected into each coherent oscillator.

5. The quantum computer using an ising model according to claim 4, wherein each master oscillator-to-coherent oscillator phase control unit implements the sign of the pseudo Zeeman energy in each coherent oscillator by controlling lead or lag of an injection phase for each coherent oscillator with respect to the oscillation phase of the master oscillator.

6. The quantum computer using an ising model according to claim 1, wherein each oscillation frequency control unit controls the oscillation frequency of each coherent oscillator so as to be the oscillation frequency of the master oscillator by performing control such that an interference intensity of oscillated light of each coherent oscillator and oscillated light of the master oscillator is an extreme value with respect to a change in the oscillation frequency of each coherent oscillator.

7. The quantum computer using an ising model according to claim 1, wherein each inter-coherent oscillator optical path length control unit controls an optical path length between two coherent oscillators so as to be a half-integer multiple or an integer multiple of an oscillation wavelength of the injection synchronization by performing control such that an interference intensity of oscillated light of the two coherent oscillators is an extreme value with respect to a change in the optical path length between the two coherent oscillators.

8. The quantum computer using an ising model according to claim 1, wherein control of the oscillation frequency of each coherent oscillator in each oscillation frequency control unit, control of the optical path length between two coherent oscillators in each inter-coherent oscillator optical path length control unit, and measurement of the pseudo ising spins of the plurality of the coherent oscillators in the oscillation phase measuring unit are performed in the mentioned order.

9. The quantum computer using an ising model according to claim 1, further comprising a pumping current control unit that performs gradual increase control of pumping currents of two coherent oscillators for the two coherent oscillators performing pseudo ising interaction through each inter-coherent oscillator optical path unit in a state in which the magnitude and the sign of the pseudo ising intersection between the two coherent oscillators are implemented to be fixed values and performs fixing control of the pumping currents of the two coherent oscillators at a time point when the plurality of the coherent oscillators arrive at one integrally oscillation mode for the first time,
wherein the oscillation phase measuring unit, after the plurality of the coherent oscillators arrive at one integrally oscillation mode so as to arrive at a steady state, measures the pseudo ising spins of the plurality of the coherent oscillators by measuring relative values of the oscillation phases of the plurality of the coherent oscillators with respect to the oscillation phase of the master oscillator.

10. The quantum computer using an ising model according to claim 1, further comprising an adjacent ising spin direction fixing unit that is arranged in each master oscillator-to-coherent oscillator optical path unit, and, for two coherent oscillators performing pseudo ising interaction through each inter-coherent oscillator optical path unit, by controlling the intensity and the phase of light injected into the two coherent oscillators when relative values of the oscillation phases of the two coherent oscillators with respect to the oscillation phase of the master oscillator are not measured to be meaningful, fixes the directions of pseudo ising spins of the two coherent oscillators to be different from each other when the sign of the pseudo ising interaction between the two coherent oscillators is implemented to be positive and fixes the directions of the pseudo ising spins of the two coherent oscillators to be the same when the sign of the pseudo ising interaction between the two coherent oscillators is implemented to be negative.

11. The quantum computer using an ising model according to claim 10, further comprising a peripheral ising spin direction fixing unit that is arranged in each master oscillator-to-coherent oscillator optical path unit, and, for two coherent oscillators performing pseudo ising interaction through each inter-coherent oscillator optical path unit, by controlling the intensity and the phase of light injected into an adjacent coherent oscillator performing pseudo ising interaction with the two coherent oscillators through another inter-coherent oscillator optical path unit when relative values of the oscillation phases of the two coherent oscillators with respect to the oscillation phase of the master oscillator are not measured to be meaningful, fixes the direction of the pseudo ising spin of the adjacent coherent oscillator to a direction of a current time point during computation.

12. The quantum computer using an ising model according to claim 1, wherein a delay time of the pseudo ising interaction between two coherent oscillators performing pseudo ising interaction through each inter-coherent oscillator optical path unit is shorter than the reciprocal of the injection locking width in the master oscillator and the two coherent oscillators.

13. The quantum computer using an ising model according to claim 1, wherein the plurality of the coherent oscillators are a plurality of slave lasers.

14. The quantum computer using an ising model according to claim 1, wherein the plurality of the coherent oscillators are a plurality of Bose-Einstein condensates.

15. The quantum computer using an ising model according to claim 1, wherein the master oscillator is a master laser.

16. A quantum computing using an ising model comprising:
an oscillation starting step of starting oscillation of a plurality of coherent oscillators that oscillate light having polarization polarized in a same direction determined in advance in correspondence with a plurality of sites of the ising model and of starting oscillation of a master oscillator that performs injection synchronization for the plurality of coherent oscillators and oscillates light having polarization polarized in the same direction determined in advance;
an oscillation frequency control step of controlling an oscillation frequency of each one of the coherent oscillators so as to be an oscillation frequency of the master oscillator;
an inter-coherent oscillator intensity optical path length control step of implementing the magnitude of pseudo ising interaction between two coherent oscillators by controlling the intensity of light exchanged between the two coherent oscillators for each pair of the plurality of the coherent oscillators and of implementing the sign of the pseudo ising interaction between two coherent oscillators by controlling an optical path length between the two coherent oscillators for each pair of the plurality of the coherent oscillators; and
an oscillation phase measurement step of measuring pseudo ising spins of the plurality of the coherent oscillators by measuring relative values of oscillation phases of the plurality of the coherent oscillators with respect to the oscillation phase of the master oscillator after the plurality of the coherent oscillators arrive at a steady state.

17. The quantum computing using an ising model according to claim 16, wherein the inter-coherent oscillator intensity optical path length control step implements the sign of pseudo ising interaction between two coherent oscillators by performing control such that the optical path length between the two coherent oscillators is a half-integer multiple or an integer multiple of an oscillation wavelength of the injection synchronization.

18. The quantum computing using an ising model according to claim 16, wherein, in the oscillation phase measurement step, directions of pseudo ising spins of two coherent oscillators are determined to be the same when oscillation phases of both the coherent oscillators lead before or lag behind the oscillation phase of the master oscillator for each pair of the plurality of the coherent oscillators, and the directions of the pseudo ising spins of two coherent oscillators are determined to be different from each other when an oscillation phase of one coherent oscillator leads before the oscillation phase of the master oscillator, and the oscillation phase of the other coherent oscillator lags behind the oscillation phase of the master oscillator.

19. The quantum computing using an ising model according to claim 16, further comprising of a master oscillator-to-coherent oscillator intensity phase control step of implementing the magnitude of pseudo Zeeman energy in each coherent oscillator by controlling the intensity of light injected into each coherent oscillator and of implementing the sign of the pseudo Zeeman energy in each coherent oscillator by controlling the phase of light injected into each coherent oscillator, in parallel with the inter-coherent oscillator intensity optical path control step.

20. The quantum computing using an ising model according to claim 19, wherein, in the master oscillator-to-coherent oscillator intensity phase control step, the sign of the pseudo Zeeman energy in each coherent oscillator is implemented by controlling lead or lag of an injection phase for each coherent oscillator with respect to the oscillation phase of the master oscillator.

\* \* \* \* \*